United States Patent
Inoue et al.

(10) Patent No.: US 11,175,613 B2
(45) Date of Patent: Nov. 16, 2021

(54) COOLING DEVICE AND IMAGE FORMING SYSTEM

(71) Applicant: Canon Kabushiki Kaisha, Tokyo (JP)

(72) Inventors: Yuki Inoue, Ibaraki (JP); Atsushi Yoshida, Chiba (JP); Kazunari Hatazaki, Ibaraki (JP); Youichi Chikugo, Chiba (JP); Noriaki Koyanagi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/951,315

(22) Filed: Nov. 18, 2020

(65) Prior Publication Data

US 2021/0072699 A1 Mar. 11, 2021

Related U.S. Application Data

(63) Continuation of application No. PCT/JP2019/022244, filed on May 29, 2019.

(30) Foreign Application Priority Data

Jun. 1, 2018 (JP) .............................. JP2018-106498
May 20, 2019 (JP) .............................. JP2019-094460

(51) Int. Cl.
*G03G 15/20* (2006.01)
*G03G 15/00* (2006.01)
(Continued)

(52) U.S. Cl.
CPC ..... *G03G 15/2017* (2013.01); *G03G 15/2021* (2013.01); *G03G 15/6573* (2013.01); *G03G 21/20* (2013.01); *H04N 1/00981* (2013.01)

(58) Field of Classification Search
CPC ........... G03G 15/2017; G03G 15/2021; G03G 15/6573; G03G 21/20; G03G 21/206; G03G 2215/00421; G03G 2215/00426
(Continued)

(56) References Cited

U.S. PATENT DOCUMENTS 6,259,871 B1 7/2001 Rider et al.
7,890,024 B2 2/2011 Hirayama et al. ............ 399/122
(Continued)

FOREIGN PATENT DOCUMENTS

JP 2003-076222 A 3/2003
JP 2006-098461 A 4/2006
(Continued)

OTHER PUBLICATIONS

Written Opinion and International Search Report issued in corresponding International Application No. PCT/JP2019/022244 dated Jul. 3 and 16, 2019, respectively.
(Continued)

*Primary Examiner* — Robert B Beatty
(74) *Attorney, Agent, or Firm* — Venable LLP

(57) ABSTRACT

An external cooling device 101 is connectable to an image forming apparatus 100. The external cooling device 101 improves cooling power of a recording material S after toner image fixation. In this case, even when a heating amount of the fixing device 11 is increased, a temperature of the recording material S stacked on a stacking unit 60 can be lowered to not more than a predetermined temperature at which sticking does not occur. Further, the number of sheets stackable on said stacking unit 60 can be increased. By this, a user is capable of adjusting glossiness without concern for the sticking of the recording materials S on the stacking unit 60. Further, the user is not required to frequently carry out the recording material S of the stacking unit 60. That is, it (Continued)

is possible to provide an image forming system 1X capable of flexibly meeting the recording materials S of various kinds.

8 Claims, 14 Drawing Sheets

(51) Int. Cl.
  *G03G 21/20* (2006.01)
  *H04N 1/00* (2006.01)
(58) Field of Classification Search
  USPC .................................. 399/341, 405, 407
  See application file for complete search history.

(56) References Cited

U.S. PATENT DOCUMENTS

| | | | |
|---|---|---|---|
| 7,890,038 B2 | 2/2011 | Chikugo et al. ............. 399/323 | |
| 8,218,990 B2* | 7/2012 | Toyohara ............... G03G 13/20 | |
| | | | 399/67 |
| 8,467,710 B2* | 6/2013 | Suzuki ............... G03G 15/6573 | |
| | | | 399/322 |
| 8,625,155 B2* | 1/2014 | Omata ................. G03G 15/205 | |
| | | | 358/1.9 |
| 8,929,794 B2 | 1/2015 | Hatazaki ...................... 399/341 | |
| 9,026,020 B2 | 5/2015 | Chikugo ...................... 399/322 | |
| 9,075,355 B2 | 7/2015 | Chiyoda et al. ... G03G 15/2025 | |
| 9,207,602 B2 | 12/2015 | Hatazaki ............ G03G 15/2064 | |
| 9,217,964 B2 | 12/2015 | Hatazaki ............ G03G 15/2025 | |
| 9,310,723 B2 | 4/2016 | Hatazaki ............ G03G 15/2025 | |
| 9,329,534 B2 | 5/2016 | Hatazaki ............ G03G 15/2025 | |
| 9,348,292 B2 | 5/2016 | Chikugo ............ G03G 15/6573 | |
| 9,367,006 B2 | 6/2016 | Yoshida et al. .... G03G 15/2053 | |
| 9,454,111 B2 | 9/2016 | Hatazaki ............ G03G 15/2025 | |
| 2005/0226663 A1 | 10/2005 | Behnke et al. | |
| 2007/0098470 A1* | 5/2007 | Shida ................. G03G 15/6573 | |
| | | | 399/341 |
| 2008/0166161 A1* | 7/2008 | Washino ............ G03G 15/2028 | |
| | | | 399/329 |
| 2011/0229169 A1* | 9/2011 | Onodera ................ B65H 29/60 | |
| | | | 399/45 |
| 2014/0016975 A1* | 1/2014 | Shimada ............. G03G 21/206 | |
| | | | 399/341 |
| 2014/0044462 A1 | 2/2014 | Ikeda et al. | |
| 2017/0153581 A1 | 6/2017 | Chikugo ................ G03G 15/20 | |
| 2020/0233353 A1 | 7/2020 | Tsuno et al. ....... G03G 15/2053 | |
| 2020/0233354 A1 | 7/2020 | Tatezawa et al. .. G03G 15/2064 | |
| 2020/0285193 A1 | 9/2020 | Hatazaki ............ G03G 15/6573 | |
| 2020/0363764 A1 | 11/2020 | Inoue et al. ........ G03G 15/6555 | |
| 2020/0387092 A1 | 12/2020 | Hatazaki ............ G03G 15/2025 | |
| 2020/0387093 A1 | 12/2020 | Hatazaki ............ G03G 15/2025 | |

FOREIGN PATENT DOCUMENTS

| | | | | |
|---|---|---|---|---|
| JP | 2006184549 A | * | 7/2006 | |
| JP | 2008112102 A | * | 5/2008 | |
| JP | 2008-299291 A | | 12/2008 | |
| JP | 2010-001108 A | | 1/2010 | |
| JP | 2011123193 A | * | 6/2011 | |
| JP | 2012-137631 A | | 7/2012 | |
| JP | 5272424 B2 | | 8/2013 | |
| JP | 2014-021310 A | | 2/2014 | |
| JP | 2014-035529 A | | 2/2014 | |
| JP | 2014021310 A | * | 2/2014 | |
| JP | 2014-238556 A | | 12/2014 | |
| JP | 2015-075693 A | | 4/2015 | |

OTHER PUBLICATIONS

U.S. Appl. No. 17/113,656, filed Dec. 12, 2020.
U.S. Appl. No. 17/112,183, filed Dec. 4, 2020.
U.S. Appl. No. 17/123,793, filed Dec. 16, 2020.
U.S. Appl. No. 17/123,773, filed Dec. 16, 2020.
U.S. Appl. No. 17/094,077, filed Nov. 10, 2020.
U.S. Appl. No. 17/160,062, filed Jan. 27, 2021.
U.S. Appl. No. 17/160,071, filed Jan. 27, 2021.

* cited by examiner (a)

(b)

COOLING DEVICE AND IMAGE FORMING SYSTEM

CROSS-REFERENCE TO RELATED APPLICATIONS

This application is a continuation of International Patent Application No. PCT/JP2019/022244, filed May 29, 2019, which claims the benefit of Japanese Patent Application No. 2018-106498, filed Jun. 1, 2018, and Japanese Patent Application No. 2019-094460, filed May 20, 2019. The foregoing applications are incorporated herein by reference in their entireties.

TECHNICAL FIELD

The present invention relates to a cooling device, for cooling function expansion, capable of being connectable to an image forming apparatus, such as a printer, a copying machine, a facsimile machine or a multi-function machine, using an electrophotographic type.

BACKGROUND ART

In an image forming apparatus of the electrophotographic type, a toner image formed on a recording material such as paper is fixed on the recording material by being heated and pressed by a fixing device. Fixation of the toner image is carried out by nipping and feeding the recording material by a fixing roller heated by a heater or the like and a pressing roller press-contacted to the fixing roller. The recording material is heated when the toner image is fixed, and therefore, the recording material fed from the fixing device is liable to increase in temperature compared with before the fixation. Then, after the toner image is fixed, when the toner image is fed and discharged while being kept at a temperature higher than a predetermined temperature, there is a liability that glossiness of the toner image becomes non-uniform with feeding or that recording materials stacked on a stacking portion stick to each other by toner. In order to suppress such non-uniformity of the glossiness or the recording material sticking during stacking, or the like, in Japanese Patent No. 5272424, in order to lower the temperature of the recording material after the toner image fixation to a predetermined temperature or less, a cooling device for cooling the recording material fed from the fixing device is provided. In the cooling device described in patent document 1, one of a pair of feeding belts nipping and feeding the recording material fed from the fixing device is cooled by a heat sink, and the temperature of the recording material is lowered through the cooled feeding belt.

SUMMARY OF THE INVENTION

Problem to be Solved by the Invention

In recent years, the image forming apparatus is required to have a multimedia compatibility and high productivity (the number of sheets subjected to image formation per unit time) so as to be capable of meeting recording materials of various kinds, such as plain paper, thick paper, roughed paper (surface roughed paper), uneven paper (embossed paper or the like), and coated paper. For example, in the case of the thick paper, when compared with the plain paper, heat is conducted from the fixing roller to the recording material and thus the temperature of the fixing roller lower, and therefore, there is a liability that improper fixing occurs. In order that the improper fixing is not caused to occur even for plain paper or thick paper, a constitution in which a temperature of the fixing roller is increased has been considered.

However, when the temperature of the fixing roller is increased, the temperature of the recording material discharged from the fixing device also becomes high. At this time, in order that the temperature of the recording material (for example, the thick paper) of which temperature when stacked onto a stacking portion is lowered to a temperature which is the same as a temperature of the plain paper, an image forming apparatus higher in cooling power than an image forming apparatus provided with a conventional cooling device is required is some cases.

However, conventionally, there was no image forming system capable of meeting of needs the users requiring higher cooling power for the image forming apparatus provided with the cooling device.

Further, for users utilizing the image forming apparatus provided with no cooling device, in the case where a recording material such as the thick paper needed to increase a fixing temperature is used, there was a liability that recording materials stacked on the stacking portion stick to each other. For such users, in order to uniformize the guide of the toner image and to suppress the sticking between the recording materials stacked on the stacking portion, a new replacement image forming apparatus provided with a cooling device has to be bought. For that reason, it is not easy for the user utilizing the image forming apparatus provided with no cooling device to enhance a cooling performance of the image forming apparatus.

The present invention has been accomplished in view of the above problem, and an object of the present invention is to provide a cooling device and an image forming system which are capable of enhancing the cooling performance of the image forming apparatus.

Means for Solving the Problem

According to an aspect of the present invention, there is provided a cooling device which is connectable to an apparatus, the apparatus including a fixing device for fixing a toner image formed by an image forming portion for forming the toner image on a recording material, on the recording material by heating the toner image and which is capable of cooling a sheet discharged from the apparatus, the cooling device comprising: a receiving port for receiving the recording material discharged from the image forming apparatus; a feeding unit, provided downstream of the receiving portion with respect to a recording medium feeding direction, for feeding the sheet received from the receiving port; and a cooling unit for cooling the recording material fed by the feeding unit, and an image forming system using the cooling device.

EMBODIMENTS FOR CARRYING OUT THE INVENTION

<Image Forming System>

A schematic structure of an image forming system of this embodiment will be described using FIGS. 1 and 2. An image forming system 1X of this embodiment includes, as shown in FIG. 1, an image forming apparatus 100 for forming an image on a recording material S and an external cooling device 101 for cooling the recording material S on which the image is formed on the recording material S by the image forming apparatus 100.

<Image Forming Apparatus>

Figure 1:
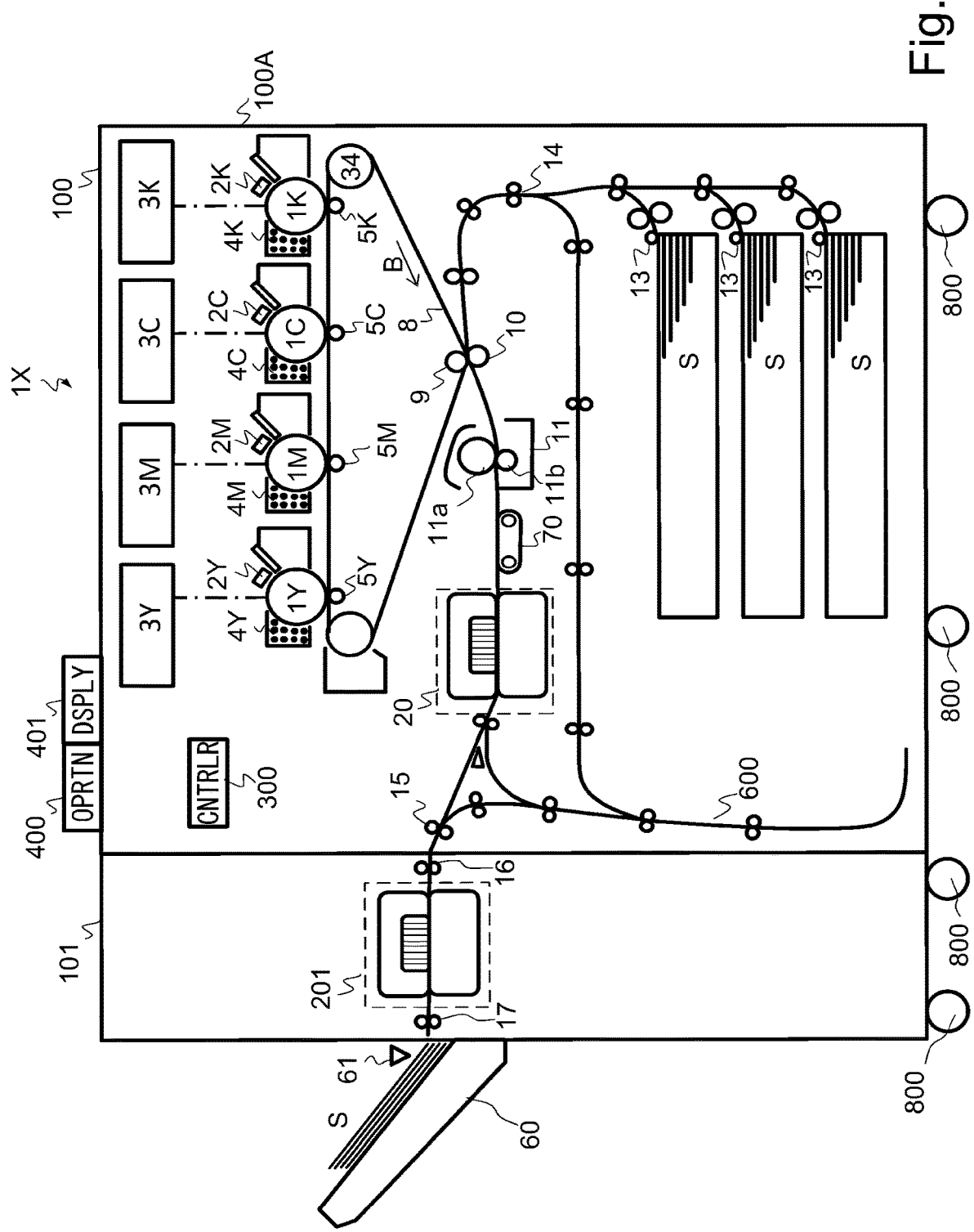
FIG. 1 is a schematic view showing a structure of an image forming system of this embodiment.

The image forming apparatus 100 shown in FIG. 1 is an electrophotographic full-color printer of a tandem type. The image forming apparatus 100 includes image forming portions PY, PM, PC and PK for forming images of yellow, magenta, cyan and black, respectively. The image forming apparatus 100 forms a toner image on a recording material S in response to an image signal sent from an original reading device (not shown) connected to an apparatus main assembly 100A or from an external device such a personal computer communicatably connected to the apparatus main assembly 100A. As the recording material S, it is possible to cite sheet materials of various kinds, such as sheets including plain paper, thick paper, roughened paper, uneven paper and coated paper; plastic films; and cloths.

As shown in FIG. 1, the image forming portions PY, PM, PC and PK are juxtaposed along a movement direction of the intermediary transfer belt 8 in the apparatus main assembly 100A. The intermediary transfer belt 8 is constituted so as to be stretched by the plurality of the stretching rollers and to be travelled in an arrow R2 direction. Further, the intermediary transfer belt 8 carries and feeds a primary-transferred toner image. At a position opposing, through the intermediary transfer belt 8, a roller 9 stretching the intermediary transfer belt 8, an outer secondary transfer roller 10 is disposed, so that a secondary transfer portion T2 where the toner image on the intermediary transfer belt 8 is transferred onto the recording material S is formed. On a side downstream of the secondary transfer portion T2 with respect to a recording material feeding direction, a fixing device 11 is provided.

At a lower portion of the image forming apparatus 100, a cassette 12 in which recording materials S are accommodated. The recording material S is fed from the cassette 12 toward a registration roller pair 14 by a feeding roller 13. Thereafter, the registration roller pair 14 is started to be rotated in synchronism with the toner image formed on the intermediary transfer belt 8, so that the recording material S is fed toward the secondary transfer portion T2. Incidentally, in this embodiment, only one cassette 12 is shown, but a plurality of cassettes 12 capable of accommodating the recording materials different in size and thickness may also be provided, and in that case, the recording material S is selectively fed from either one of the plurality of cassettes 12. Further, the recording material S is not limited to the recording material S accommodated in the cassette 12, but the recording material S stacked on a manual feeding portion (not shown) may also be fed.

The four image forming portions PY, PM, PC and PK included in the image forming apparatus 100 have the substantially same constitution except that development colors are different from each other. Accordingly, in this embodiment, as a representative, the image forming portion PK will be described, and other image forming portions will be omitted from description.

Figure 2:
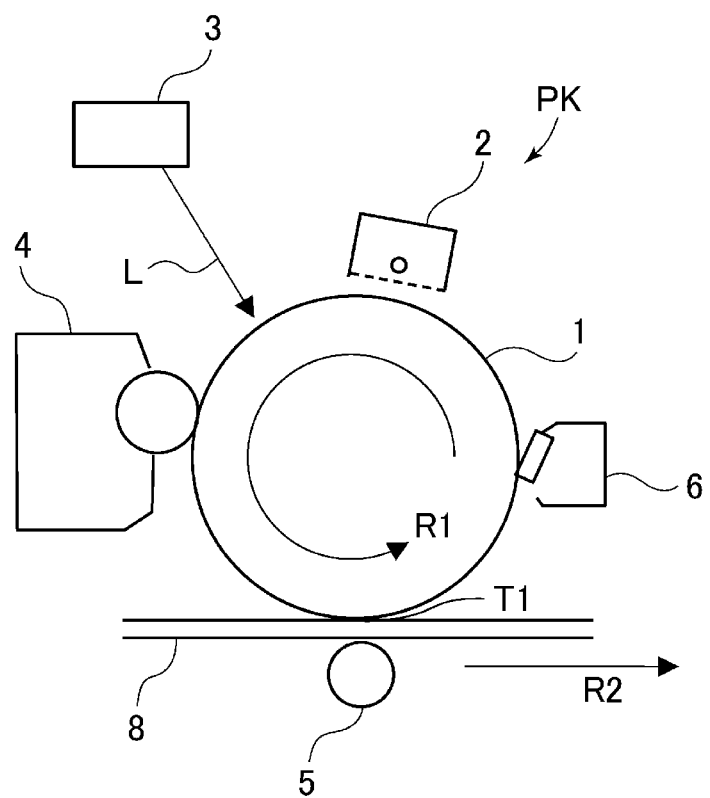
FIG. 2 is a schematic view showing an image forming portion.

As shown in FIG. 2, in the image forming portion PK, a cylindrical photosensitive drum 1 is provided as a photosensitive member. The photosensitive drum 1 is rotationally driven in an arrow R1 direction. At a periphery of the photosensitive drum 1, a charging device 2, an exposure device 3, a developing device 4, the primary transfer roller 5 and a cleaning device 6 are provided.

A process for forming, for example, a full-color image by the image forming apparatus 100 will be described. First, when an image forming operation is started, a surface of the rotating photosensitive drum 1 is electrically charged uniformly by the charging device 2. The charging device 2 is a corona charger or the like for charging the photosensitive drum 1 to a uniform negative dark-portion potential by irradiating the photosensitive drum 1 with charge particles with corona discharge, for example. Then, the photosensitive drum 1 is subjected to scanning exposure to laser light L which is emitted from the exposure device 3 and which corresponds to an image signal. By this, an electrostatic latent image depending on the image signal is formed on the surface of the photosensitive drum 1. The electrostatic latent image formed on the photosensitive drum 1 is visualized (developed) into a visible image by toner (developer) accommodated in the developing device 4.

The resultant toner image formed on the photosensitive drum 1 is primary-transferred onto the intermediary transfer belt 8 at a primary transfer portion T1 formed between the intermediary transfer belt 8 and the photosensitive drum 1 opposing the primary transfer roller 5. At this time, to the primary transfer roller 5, a primary transfer bias (voltage) is applied. After the primary transfer, toner remaining on the surface of the photosensitive drum 1 is removed by the cleaning device 6.

Such an operation is sequentially performed in the image forming portions PY, PM, PC and PK for yellow, magenta, cyan and black, respectively, so that four color toner images are superposed on the intermediary transfer belt 8. Thereafter, in synchronism with toner image forming timings, the recording material S accommodated in the cassette 12 is fed to the secondary transfer portion T2. Then, by applying a secondary transfer bias (voltage) to the outer secondary transfer roller 10, the toner images for a full-color image are collectively secondary-transferred onto the recording material S.

Then, the recording material is fed to the fixing device 11. The fixing device 11 includes a fixing roller 11a provided rotatably and a pressing roller 11b rotating while being press-contacted to the fixing roller 11a. In a state in which the pressing roller 11b is press-contacted to the fixing roller 11a, the fixing roller 11a is rotated at a predetermined rotational speed (for example, 400 mm/sec) by an unshown driving motor. Inside the fixing roller 11a, a halogen heater 11c (not shown) is provided, and by the halogen heater 11c, a surface temperature of the fixing roller 11a is increased, so that the fixing device 11 is capable of heating the recording material S.

Figure 5:
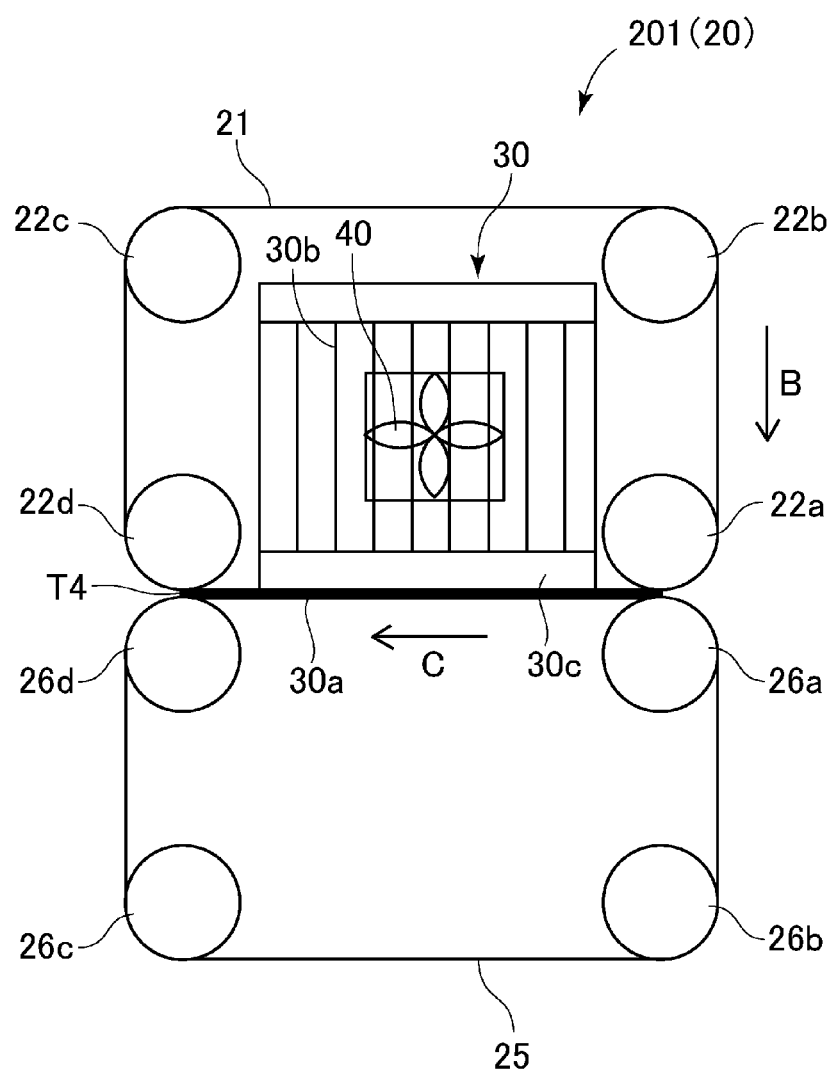
FIG. 5 is a schematic view showing a recording material cooling device.

At a fixing nip T3 formed by the fixing roller 11a and the pressing roller 11b, the fixing device 11 nips and feeds the recording material S on which the full-color toner image is formed and thus heats and presses fed recording material S, so that the full-color toner image is fixed on the recording material S. That is, the toners of the full-color toner image formed on the recording material S are melted and mixed by heating and pressing, and are fixed as a full-color image on the recording material S. Thus, a series of operations of the image forming process is ended. Then, the recording material S on which the toner image is fixed is fed toward a recording material cooling device 20 by a feeding device 70 through for example air suction. The recording material cooling device 20 as an internal cooling unit cools the recording material S. The recording material cooling device 20 will be described later (FIG. 5).

In the case of this embodiment, the image forming apparatus 100 is capable of performing double-side printing. In the case of single-side printing, the recording material S cooled by the recording material cooling device 20 is discharged by a discharging roller pair 15 to an outside of the apparatus main assembly 100A through a discharge opening 100Aa (FIG. 3) formed in the apparatus main assembly 100A. The recording material S is discharged through the discharge opening 100Aa by the fixing device 11 in a state a front surface side where the toner image is formed is oriented upward (so-called face-up sheet feeding) or is discharged through the discharge opening 100Aa in a state in which the front surface side where the toner image is formed is oriented downward (so-called face-down sheet feeding).

Figure 3:
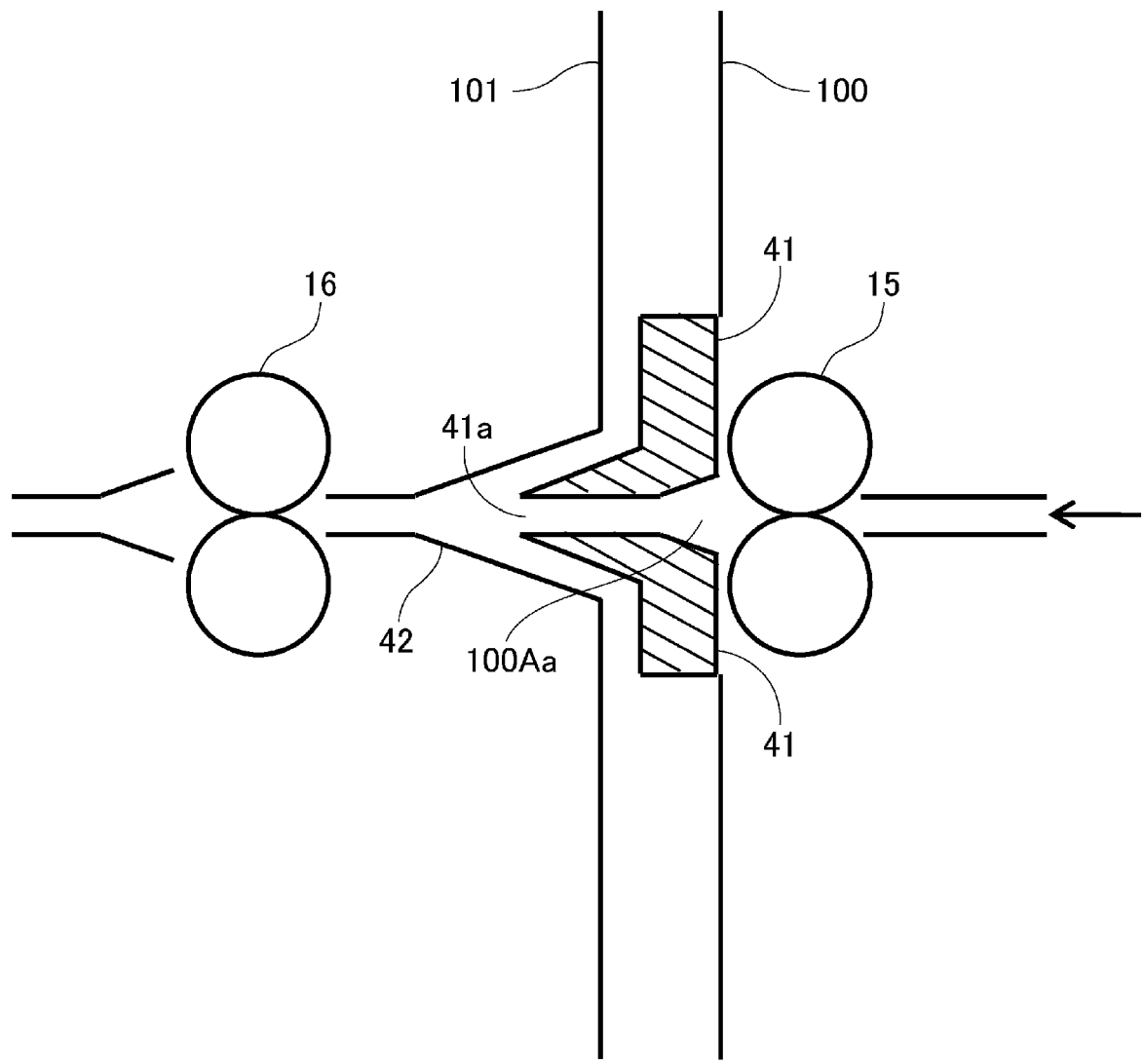
FIG. 3 is an enlarged view showing a delivery portion of a recording material in an enlarged manner.

In the case of the double-side printing, the recording material cooled by the recording material cooling device 20 is fixed is fed toward a reverse feeding passage 600 for the double-side printing. In the reverse feeding passage 600, the recording material S is reversed, so that a front surface and a back surface of the recording material S are replaced with each other. The reversed recording material S is fed toward the registration roller pair 14, and then is fed by the registration roller pair 14 toward the secondary transfer portion T2 in a state in which the back surface side thereof where printing has not been carried out faces the intermediary transfer belt 8 side. At the secondary transfer portion T2, the toner images for a full-color image formed on the intermediary transfer belt 8 are collectively secondary-transferred on the recording material S (the back surface side). Thereafter, the recording material S is subjected to toner image fixing by the fixing device 11 and cooling by the recording material cooling device 20, and the recording material S after the cooling is discharged through the discharge opening 100Aa (FIG. 3).

In the case of this embodiment, an external cooling device 101 as the external cooling device is connected to the apparatus main assembly 100A on a downstream side with respect to the sheet feeding direction. Here, each of the external cooling device 101 and the image forming apparatus 100 is provided with a plurality of installation portions 800 such as casters or installation legs which are installed on an installation surface such as a floor. The external cooling device 101 is constituted so as to be connectable to the image forming apparatus, as one of peripheral devices (which are called option units or the like) which are capable of being retrofitted to the image forming apparatus 100 in order to expand a function of the image forming apparatus 100. The external cooling device 101 is disposed for lowering a temperature of the recording material S to a predetermined temperature or less by cooling the recording material S discharged through the discharge opening 100Aa of the apparatus main assembly. Thus, by connecting the external cooling device 101 to the image forming apparatus 100, even in the case where the temperature of the sheet (recording material S) is not lowered to the predetermined temperature or less only by the recording material cooling device 20, the temperature of the sheet can be lowered to the predetermined temperature or less. The external cooling device 101 includes a recording material cooling device 201 for cooling the recording material S. The recording material cooling device 201 will be described later (FIG. 5).

Incidentally, as the peripheral devices, in addition to the external cooling device 101, it is possible to cite a stapler device for fastening the recording material S with a staple, a boring device for boring a punch hole in the recording material S, a binder device for binding a book, a stacker device on which recording materials S in a large amount are stackable, and the like. These peripheral devices are connectable to each other in an appropriate combination, and a plurality of external cooling devices 101 may also be connected to each other. A user is capable of easily improving cooling power of the recording material S to the image forming apparatus 100 provided with an already-existing recording material cooling device 20 by increasing the number of external cooling devices 101 to be connected to the image forming apparatus 100. That is, by connecting a plurality of external cooling devices 101 to the image forming apparatus 100, the user is capable of easily improving the cooling downstream of the recording material S to the image forming apparatus 100.

The recording material S cooled by the external cooling device 101 is discharged from the external cooling device 101 by a discharging roller 17, and is stacked on a stacking unit 60 as a stacking portion. The stacking unit 60 is provided so as to be mountable to and dismountable from the external cooling device 101 or the image forming apparatus 100. That is, the stacking unit 60 is mounted to the image forming apparatus 100 in the case where the external cooling device 101 is not connected to the image forming apparatus 100. Further, when the external cooling device 101 is connected to the image forming apparatus 100, the stacking unit 60 is dismounted from the 100A and is attached to the external cooling device 101.

The stacking unit 60 is provided so as to be movable in an up-down direction (vertical direction) relative to the image forming apparatus 100 or the external cooling device 101. Therefore, the stacking unit 60 is capable of stacking the recording materials S to a predetermined height by being lowered relative to the discharge opening of the external cooling device 101. The stacking unit 60 is provided with a stacking detecting portion 61 for detecting that the stacked recording materials S reached a predetermined height. Incidentally, the stacking detecting portion 61 is provided on the external cooling device 101 side may also detect a position of the stacking unit 60 relative to the apparatus main assembly or may also detect a stacking height of the recording materials S stacked on the stacking tray (unit) 60.

As described above, the external cooling device 101 is connected to the image forming apparatus 100, so that the recording material S is delivered from the image forming apparatus 100 to the external cooling device 101. In FIG. 3, a delivering portion for delivering the recording material S between the image forming apparatus 100 and the external cooling device 101 is shown in an enlarged manner. Further, in FIG. 4, a connecting member for connecting the image forming apparatus 100 and the external cooling device 101 is shown.

As shown in FIG. 3, the image forming apparatus 100 is provided with a pair of discharging guides 41, and the external cooling device 101 is provided with a pair of receiving guides 42. The pair of discharging guides 41 is disposed with an interval so as to be opposed to each other vertically. Further, the pair of receiving guides 42 is disposed with an interval so as to be opposed to each other vertically.

Then, the recording material S discharged through the discharge opening 100Aa is guided by these discharging guides 41 and is delivered to a receiving opening of the external cooling device 101. Here, a most upstream opening with respect to the recording material feeding direction, positioned between the pair of receiving guides 42 is the recording material receiving opening of the external cooling device 101. In the case of this embodiment, the discharging guides 41 includes a guiding portion 41a extending toward the external cooling device 101. The discharging guides 41 includes the guiding portion 41a, so that a direction of discharge of the roller S discharged through the discharge opening 100Aa by the discharging roller 15 is determined. Here, an end portion on a side upstream of the discharging guides 41 with respect to the recording material feeding direction was the discharge opening of the image forming apparatus 100, but a downstream end of the discharging guides 41 may also be the discharge opening of the image forming apparatus 100.

On the other hand, in order that the discharging guides 41 can enter the receiving guides 42, the receiving guides 42 are formed so as to extend on the image forming apparatus 100 side in conformity with a shape of the guiding portion 41a of the discharging guides 41. Further, in the receiving guides 42, a feeding passage of the recording material S, which is continuous to a delivery roller 16. According to the above-mentioned constitution, the image forming apparatus 100 and the external cooling device 101 are connected to each other so as to be capable of delivering the recording material S from the image forming to apparatus 100 to the external cooling device 101 with no catch of the recording material S.

However, when the image forming apparatus 100 and the external cooling device 101 are only connected simply by the discharging guides 41 and the receiving guides 42, for example, when these guides are subjected to impact, a positional deviation between the discharging guides 41 and the receiving guides 42 occurs, so that there is a liability that delivery of the recording material S is not properly carried out. In order to prevent this, the image forming apparatus 100 and the external cooling device 101 are required to be connected so as not to move relative to each other. For that purpose, in this embodiment, a mounting/dismounting portion 51 as shown in FIG. 4 is provided on the image forming apparatus 100 side, while a mounting/dismounting claw portion 52 as shown in FIG. 4 is provided on the external cooling device 101 side.

The mounting/dismounting portion 51 is fixedly disposed in the neighborhood of the discharge opening 100Aa (see FIG. 3), for example, at a side plate portion of the image forming apparatus 100. Thus, in the neighborhood of the discharge opening 100Aa, a relative position between the image forming apparatus 100 and the external cooling device 101 is fixed by the mounting/dismounting portion 51 and the mounting/dismounting claw portion 52, so that it is possible to suppress deviation of the positions of the discharging guides 41 and the receiving guides 42 from each other. Accordingly, it is possible to suppress that abnormal feeding (so-called jam) of the sheet occurs during the delivery of the sheet, so that the delivery of the sheet from the image forming apparatus 100 to the external cooling device 101 can be accurately carried out.

Figure 4:
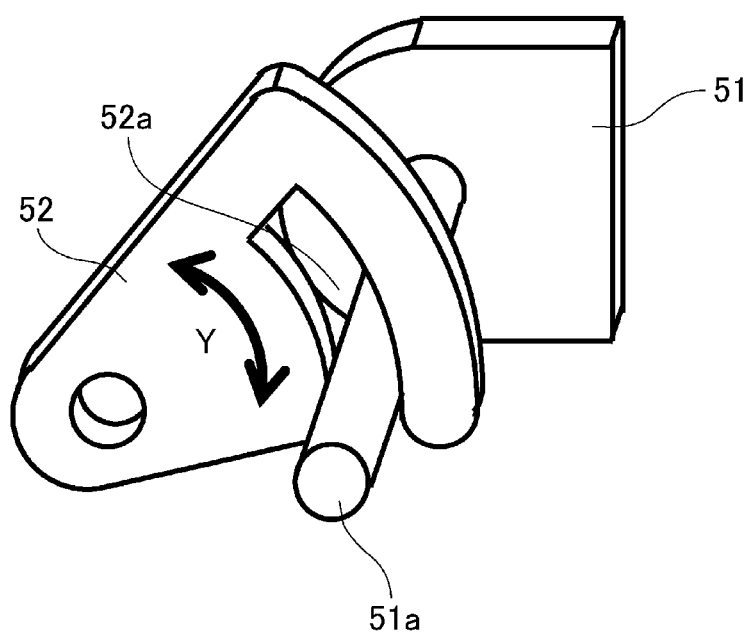
FIG. 4 is a schematic view showing a connecting member for connecting an image forming apparatus and an external cooling device.

Further, as shown in FIG. 4, the mounting/dismounting portion 51 includes a mounting/dismounting shaft 51a extended toward the mounting/dismounting claw portion 52 side. On the other hand, the mounting/dismounting claw portion 52 includes an engaging portion 52a engaging with the mounting/dismounting shaft 51a during the connection. The mounting/dismounting claw portion 52 is provided so as to be swingable relative to the external cooling device 101, and swings in an arrow Y direction shown in FIG. 4 and engages with the mounting/dismounting shaft 51a. By these mounting/dismounting portion 51 and mounting/dismounting claw portion 52, the image forming apparatus 100 and the external cooling device 101 are connected to each other, so that the image forming apparatus 100 and the external cooling device 101 are fixedly disposed so as not to move relative to each other. A position of each of such mounting/dismounting portion 51 and mounting/dismounting claw portion 52 is not limited to a single place, but for example, when each of these portions is disposed in two or more placed on a front side and a rear side in the drawing sheet in FIG. 1, the image forming apparatus 100 and the external cooling device 101 do not readily move further relative to each other, so that such arrangement is preferable.

<Recording Material Cooling Device>

Next, the recording material cooling device 20 provided in the image forming apparatus 100 and the recording material cooling device 201 provided in the external cooling device 101 will be described using FIG. 5. However, in the case of this embodiment, the recording material cooling device 20 and the recording material cooling device 201 are cooling devices having the same structure. Therefore, in the following, the recording material cooling device 201 will be described as an example.

The recording material cooling device 201 includes an endless first belt 21 and an endless second belt 25 for nipping and feeding the recording material S in cooperation with the first belt 21. Further, the recording material cooling device 201 includes a heat sink 30 for cooling at least one of the first belt 21 and the second belt 25.

As shown in FIG. 5, the first belt 21 is extended around a plurality of first belt stretching rollers 22a to 22d, and at least one of the first belt stretching rollers 22a to 22d is rotated by an unshown driving portion. By this, the first belt 21 is moved and circulated in an arrow B direction in the figure. On the other hand, the second belt 25 is extended around a plurality of second belt stretching rollers 26a to 26d and contacts the first belt 21. Therefore, the second belt 25 is moved and circulated by the first belt 21. Incidentally, in this embodiment, the first belt 21 is driven, and the second belt 25 is driven by the first belt 21, but to the contrary, the second belt 25 is driven and the first belt 21 may also be driven by the second belt 25. Or, both the first belt 21 and the second belt 25 may also be driven.

The recording material S on which the toner image is fixed is nipped between the first belt 21 and the second belt 25 and is fed in a feeding direction (arrow C direction in the figure) in accordance with circulatory movement of these belts. At that time, the recording material S passes through a cooling nip T4 formed by contact between the first belt 21 and the second belt 25. In the case of this embodiment, the first belt 21 is cooled by the heat sink 30 by bringing the heat sink 30 into contact with an inner peripheral surface of the first belt 21 in the cooling nip N4. This is because heat of the first belt 21 is conducted to the heat sink by the contact of the heat sink 30 with the first belt 21, and is dissipated by the heat sink 30. The heat sink 30 is disposed so as to contact the inner surface, of the first belt 21 at a position where the cooling nip T4 is formed, in order to efficiently cool the recording material S. The recording material S is cooled via the first belt 21 when the recording material S passes through the cooling nip T4, so that even when the toner on the recording material S is in a melted state before the recording material S contacts the first belt 21, the toner is fixed on the recording material S by being cooled. Thus, the recording material S is cooled in the cooling nip T4 formed by the first belt 21 and the second belt 25, so that the recording material S can be cooled efficiently in a short feeding passage.

The heat sink 30 is radiator (dissipater) plate formed of metal such as aluminum. The heat sink 30 includes a heat receiving portion 30a for taking heat from the first belt 21 in contact with the first belt 21, a heat radiating (dissipating) portion 30b for radiating (dissipating) heat, and a fin base 30c for transferring the heat from the heat receiving portion 30a to the heat radiating portion 30b. The heat radiating portion 30b is formed with a plurality of radiating fins in order to promote efficient radiation by ensuring a contact area to the air. For example, one of the plurality of cooling fins is set at 1 mm in thickness and 100 mm in height, and an interval between the fins of the plurality of cooling fins is set at 5 mm, and a thickness of the fin base 30c is set at 10 mm. Further, in order to forcedly cool (heat dissipation) the heat sink 30 itself, a cooling fan 40 sending the air toward the heat sink 30 (specifically the heat radiating portion 30b) is provided. An air flow rate of this cooling fan 40 is set at, for example, "2 m$^3$/min". That is, the heat of the recording material S heated by the fixing device 11 is dissipated by the heat sink 30 through the first belt 21 by passing the recording material S through the cooling nip N4 formed by the first belt 21 and the second belt 25. By this, the temperature of the recording material S is lowered by passing of the recording material S through the cooling nip N4.

In this embodiment, the cooling fan 40 is provided on a rear side of the heat sink 30 in FIG. 5, and is a fan rotating so that the air flows from a front side to a rear side of the heat sink 30. Incidentally, the constitution of the heat sink 30 is not limited to this constitution, but may also be a constitution in which the cooling fan 40 is provided on the front side than the heat sink 30 is, or in which the cooling fan 40 is rotated so that the air flows from the rear side to the front side of the heat sink 30. Further, a constitution in which a plurality of cooling fans 40, not the single cooling fan, are provided may also be employed.

Incidentally, the heat sink 30 is contacted to the first belt 21 so as to cool the first belt 21 but is not limited thereto, and may also be contacted to the second belt 25 so as to cool the second belt 25. Or, a single heat sink 30 is contacted to each of the first belt 21 and the second belt 25, so that both the belts may also be cooled. However, the heat sink 30 may preferably be contacted to the first belt 21 or the second belt 25 so as to cool the recording material S on a surface on which the toner image is fixed by the fixing device 11 before the recording material S is discharged through the discharge opening 100Aa (see FIG. 3).

Further, in the above-described explanation, the cooling device of the belt cooling type in which the recording material is nipped and fed by the two feeding belts was described, but the cooling device may also be a cooling device, constituted by a feeding belt on one side and a feeding roller on the other side, for nipping and feeding the sheet by the (feeding) belt and the feeding roller. In this case, the heat sink 30 is contacted to a belt inner peripheral surface in a nip between the feeding belt and the feeding roller, so that the recording material can be fed while being cooled. Incidentally, in the above-described embodiment, the recording material cooling device 20 and the recording material cooling device 201 are the cooling devices with the same structure, but one cooling device may also be a cooling device for cooling and feeding the recording material by two feeding belts and the other cooling device may also be a cooling device for cooling and feeding the recording material by a feeding belt and a feeding roller.

Further, a cooling means is not limited to the heat sink 30, but the first belt 21 and/or the second belt 25 may also be cooled by using a belt cooling fan for sending the air toward the belt or by a water cooling unit in which a pipe or the like in which cooled liquid is circulated is contacted to the belt or by the like means.

[Controller]

As shown in FIG. 1, the image forming apparatus 100 includes a controller 300. The controller 300 will be described using FIG. 6 while making reference to FIG. 1 and FIG. 5. However, to the controller 300, in addition to the portions (members) illustrated in the figures, various devices such as motors and power sources for operating the image forming apparatus 100 are connected, but are not the principal object of the present invention and therefore will be omitted from illustration and description of these.

The controller 300 carries out various pieces of control, such as an image forming operation, of the image forming apparatus 100, and includes a CPU 301 (Central Processing Unit) and a memory 302 such as a ROM, a RAM or a hard disk device. In the memory 302, for example, various programs such as an image forming job and various data and the like are stored. The controller 300 is capable of executing the various programs stored in the memory 302 and is capable of causing the image forming apparatus 100, the external cooling device 101, the stacking unit 60 and the like to operate by executing the various programs. Incidentally, the memory 302 can also temporarily store a calculation (computation) process result with execution of the various programs.

Figure 8:
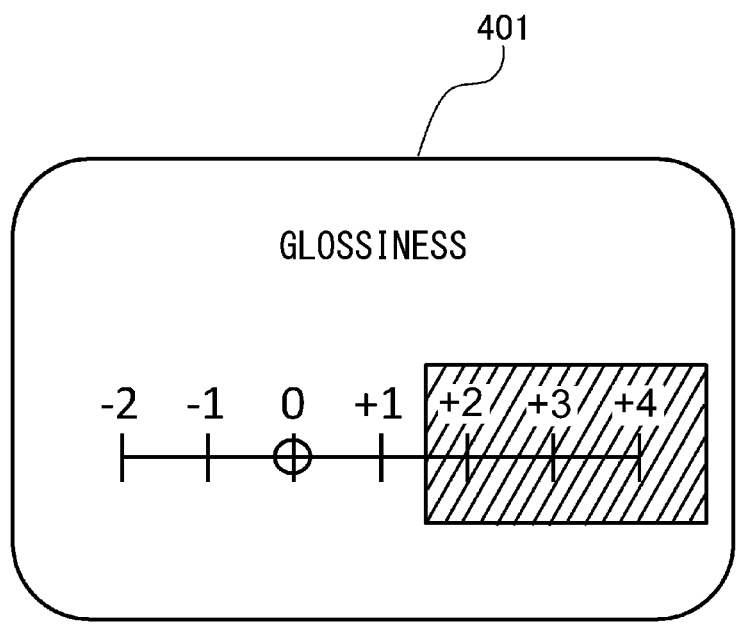
FIG. 8 includes views each showing a temperature change screen, in which (a) shows the case where an external cooling device is not connected, and (b) shows the case where the external cooling device is connected.
Figure 8:
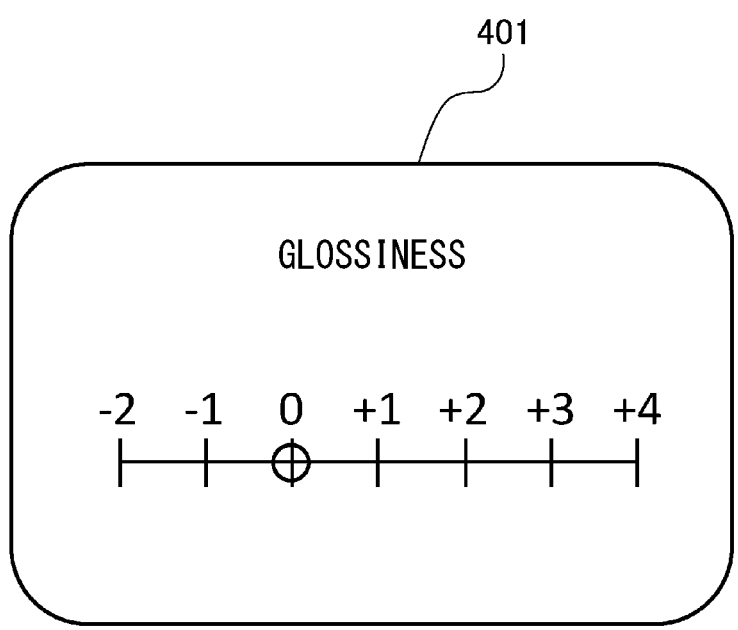

To the controller 300, through input/output interfaces, an operating portion 400, a display portion 401, a cooling unit controller 402 and a stacking unit controller 403 are connected. The operating portion 400 is, for example, an operating panel, an external terminal or the like for receiving execution instructions of the various programs by the user (users) and various data input by the user(s). The display portion 401 appropriately display various screens such as a display screen of operation errors of the image forming apparatus 100 and the external cooling device 101, a menu screen presenting executable various programs, and a "glossiness setting screen" (see part (a) of FIG. 8 and part (b) of FIG. 8) described later. The display portion 401 is, for example, a liquid crystal screen or the like. Incidentally, a phantom (virtual) operator is displayed on the display portion 401 by the controller 300, and by utilizing this phantom operator, the display portion 401 may also be constituted so as to be capable of receiving execution operations of the various programs by the user and input operations of the various data by the user. That is, the display portion 401 may also be, for example, a liquid crystal screen of a touch panel type, having a function of the operating portion 400.

The controller 300 is capable of controlling the external cooling device 101 by the cooling unit controller 402. For the recording material cooling device 201, the cooling unit controller 402 controls a belt driving motor 501 for driving at least one of first belt stretching rollers 22a to 22d, and thus controls a start and a stop of drive, a movement speed and the like of the first belt 21. Further, for the recording material cooling device 201, the cooling unit controller 402 controls a fan driving motor 502 for driving the cooling fan 40, and thus controls a start and a stop of drive, an air volume of the cooling for 40. Further, the controller 300 causes the stacking unit controller 403 to control the stacking unit 60. The stacking unit controller 403 controls an unshown motor and thus controls the stacking unit 60 so as to move the stacking unit 60 in an up-down direction. In the case of this embodiment, the controller 300 lowers the stacking unit in the case where the stacking detecting portion 61 detected that the recording material S reaches a predetermined height.

The image forming apparatus 100 and the external cooling device 101 are electrically connected by an input/output interface (for example, an electric signal line), in addition to physical connection using the above-described connecting member (see FIG. 4). The controller 300 controls the external cooling device 101 by transmission and reception of the electric signal through the input/output interface. Therefore, in the case where the transmission and reception of the electric signal through the input/output interface between the image forming apparatus 100 and the external cooling device 101 cannot be carried out, the controller 300 can discriminate that the image forming apparatus 100 and the external cooling device 101 are not connected to each other.

Incidentally, the controller 300 is capable of discriminating that the unit connected to the image forming apparatus 100 is the external cooling device 101, not another unit (for example a stacker or the like) connectable to the image forming apparatus 100, by the following method. For example, there is a method in which in the image forming apparatus 100, a position of a connection which is physical and electrically connected is changed for every another unit connectable to the image forming apparatus 100. In such a case, the controller 300 is capable of discriminating that the connectable unit is the external cooling device 101 from a difference in receiving place of the electric signal, which is the input/output interface. Further, for example, a method in which every another unit connectable to the image forming apparatus 100, a kind of a response signal which responds to the electric signal sent from the image forming apparatus 100 is changed may also be used. That is, the external cooling device 101 has a function as a discriminating portion for outputting an identification signal, as the response signal, indicating that another unit is the external cooling device 101. In this case, the controller 300 can discriminate that the connected unit is the external cooling device 101 from the contents of the response signal. Or, for example, a method in which a memory in which identification information is stored is mounted in the image forming apparatus 100 and in which the controller 300 reads the identification information of the memory through the input/output interface. Further, depending on an operation of the operating portion 400 by the user or an on/off operation of a dedicated switch provided in the image forming apparatus 100, the controller 300 may also be capable of discriminating connection or non-connection between the image forming apparatus 100 and the external cooling device 101.

Incidentally, in the case where the toner image is fixed on the recording material S (thick paper or the like) of, for example, 150-250 $g/m^2$ or more in basis weight, the recording material S is not completed cooled only by the recording material cooling device 20 in some instances. In that case, when the recording materials S in a predetermined number of sheets, for example, 100 sheets or more are continuously stacked, there is a liability that the stacked recording materials S stick to each other due to heat accumulated in the stacked recording materials S and pressure applied to the sheet positioned on a lower side(s) with respect to a stacking direction by a weight or the like of the sheet positioned on an upper side with respect to the stacking direction.

Therefore, in this embodiment, as described above, the recording material S on which the toner image is fixed is cooled by using the external cooling device 101 connected to the image forming apparatus 100 on a side downstream of the image forming apparatus 100 with respect to the sheet feeding direction. Then, by the external cooling device 101, the temperature of the recording material S such that the temperature thereof is not lowered to a predetermined temperature or less only by the recording material cooling device 20 can be lowered to the predetermined temperature or less. If so, when compared with the case where the external cooling device 101 is not used, even when a heating amount of the fixing device 11 is made large for increasing the glossiness of the toner image and for meeting various paper kinds, the temperature of the recording material S can be lowered to the predetermined temperature or less by the external cooling device 101. Further, if the temperature of the recording material S can be lowered by the external cooling device 101, the sticking of the recording materials S on the stacking unit 60 does not readily occur than in the case where the heating amount of the fixing device 11 is increased without using the external cooling device 101, and therefore, the number of stackable sheets of the recording materials S, with the same basis weight, stacked on the stacking unit 60 can be increased. In view of this point, in this embodiment, depending on the connection or non-connection of the external cooling device 101, a settable range of the heating amount of the fixing device 11 was made changeable, or the number of the stackable sheets of the recording materials S, with the same basis weight, stacked on the stacking unit 60 was made changeable. Incidentally, the image forming apparatus 100 may also be an apparatus capable of changing these factors depending on the connection or non-connection of the external cooling device 101 or may also be an apparatus capable of changing only either one of these factors depending on the connection or non-connection of the external cooling device 101. In the following, this will be described.

Figure 6:
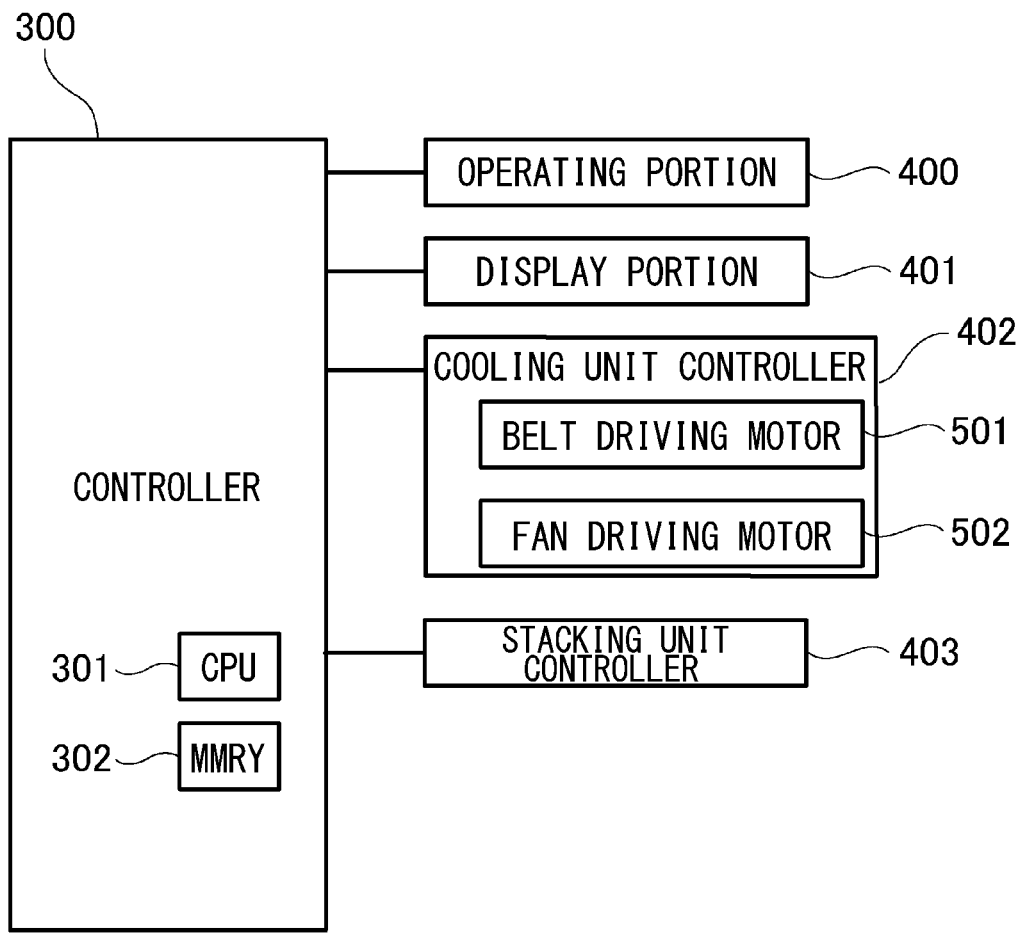
FIG. 6 is a control block diagram for illustrating a controller.
Figure 7:
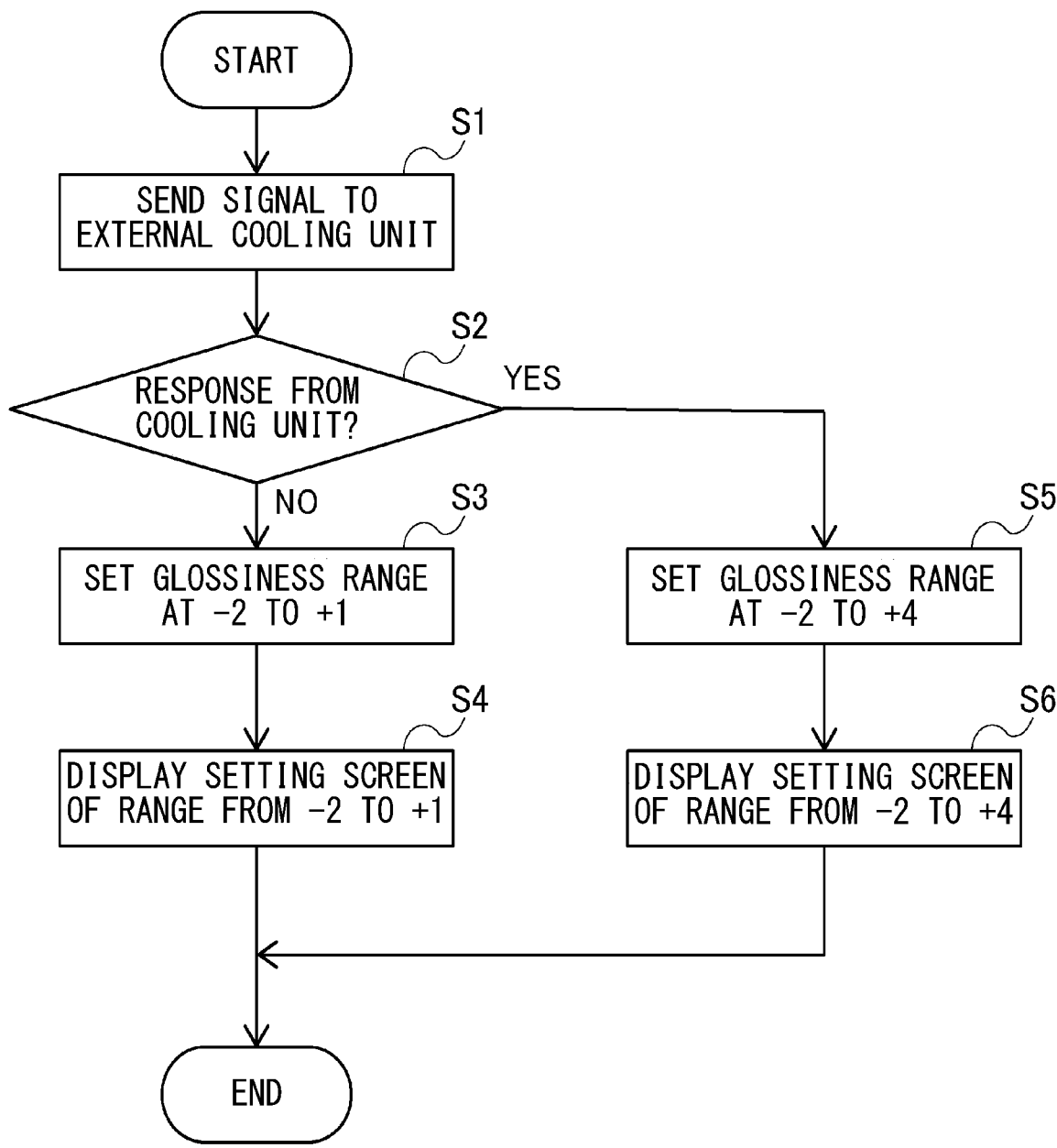
FIG. 7 is a flowchart showing a temperature change process.

First, a changing process of the settable range of the heating amount will be described using FIG. 7 while making reference to FIG. 1 and FIG. 6. As shown in FIG. 7, the controller 300 sends a predetermined signal to the external cooling device 101 (S1). The controller 300 discriminates whether or not the controller 300 receives a response signal from the external cooling device 101 in response to transmission of the above signal (S2). In the case where the controller 300 did not receives the response signal from the external cooling device 101 (NO of S2), the controller 300 discriminates that the external cooling device 101 is not connected to the image forming apparatus 100, and executes processes of the following steps S3 and S4. On the other hand, in the case where the controller 300 receives the response signal from the external cooling device 101 (YES of S2), the controller 300 discriminates that the external cooling device 101 is connected to the image forming apparatus 100, and executes processes of the following steps S5 and S6.

In the case where the external cooling device 101 is not connected to the image forming apparatus 100 (NO of S2), the controller 300 sets a setting range of the glossiness at, for example, "−2 to +1" (S3). Then, the controller 300 causes the display portion 401 to display a "glossiness setting screen" of "−2 to +1" in setting range (S4). In general, the toner on the recording material S becomes larger in glossiness of the toner after the fixation as the heating amount of the fixing device 11 becomes larger. Therefore, in this embodiment, as an index indicating the heating amount of the fixing device 11, the glossiness is employed.

In part (a) of FIG. 7, an example of the "glossiness setting screen" in which a setting range is 4 levels of "−2 to +1". On the "glossiness setting screen" shown in part (a) of FIG. 8, as to glossiness out of the setting range, it is indicated that the user cannot select the glossiness (out of the setting range) by providing hatching display or the like. Incidentally, in this embodiment, a constitution in which the glossiness out of the setting range cannot be inputted by the hatching display was employed, but selection disablement (setting disablement) may also be realized by non-display of the glossiness out of the setting range or a constitution in which selection disablement (setting disablement) is realized by returning an error although input is permitted may also be employed.

The user makes reference to this "glossiness setting screen" and operates the operating portion 400 or the like, so that the user is capable of setting the glossiness in the range of "−2 to +1". That is, in the case where the external cooling device 101 is not connected to the image forming apparatus 100, a cooling effect on the recording material S by the external cooling device 101 cannot be obtained. For that reason, when the heating amount of the fixing device 11 is made large, the recording material S is not completely cooled only by the recording material cooling device 20, the glossiness of the toner image becomes non-uniform in some instances and the stacked recording materials can cause sticking. In order to prevent this, in this embodiment, the glossiness setting range proportional to the heating amount of the fixing device 11 is limited to within the range of "−2 to +1".

On the other hand, in the case where the external cooling device 101 is connected to the image forming apparatus 100 (YES of S2), the controller 300 sets the glossiness setting range at, for example, "−2 to +4" (S5). Then, the controller 300 causes the display portion 401 to display a "glossiness setting screen" in which the setting range is 7 levels of "−2 to +4" (S6). In part (b) of FIG. 8, an example of the "glossiness setting screen" in which the setting range is "−2 to +4". On the "glossiness setting screen" shown in part (b) of FIG. 8, the hatching display regarding the glossiness out of the setting range disappears, so that the screen indicates that the user is capable of selecting the glossiness in the range of "−2 to +4". That is, in the case where the external cooling device 101 is connected to the image forming apparatus 100, a settable range of the glossiness is made larger than in the case where the external cooling device 101 is not connected to the image forming apparatus 100. The user makes reference to this "glossiness setting screen", and operates the operating portion 400 or the like, so that the user is capable of setting the glossiness within the range of "−2 to +4". That is, in the case where the external cooling device 101 is connected to the image forming apparatus 100, a higher degree of glossiness (that is, a higher fixing temperature) is made selectable. Thus, in the case where the external cooling device 101 is connected to the image forming apparatus 100, the toner image is fixable on the recording material S by the fixing device 11 at a temperature higher than in the case where the external cooling device 101 is not connected to the image forming apparatus 100.

Incidentally, in this embodiment, in display of the above-mentioned setting screen, the "glossiness" was used, but it may only be required to indicate the heating amount of the fixing device 11, i.e., indicate setting of a control temperature during fixation, and is not limited to the "glossiness". The display at a level of "−2 to +1 (or to +4)" was described as an example, but the control temperature itself during fixation may also be set. In this case, in the case where the external cooling device 101 is connected to the image forming apparatus 100, a higher fixing temperature is selectable than in the case where the external cooling device 101 is not connected to the image forming apparatus 100.

Figure 9:
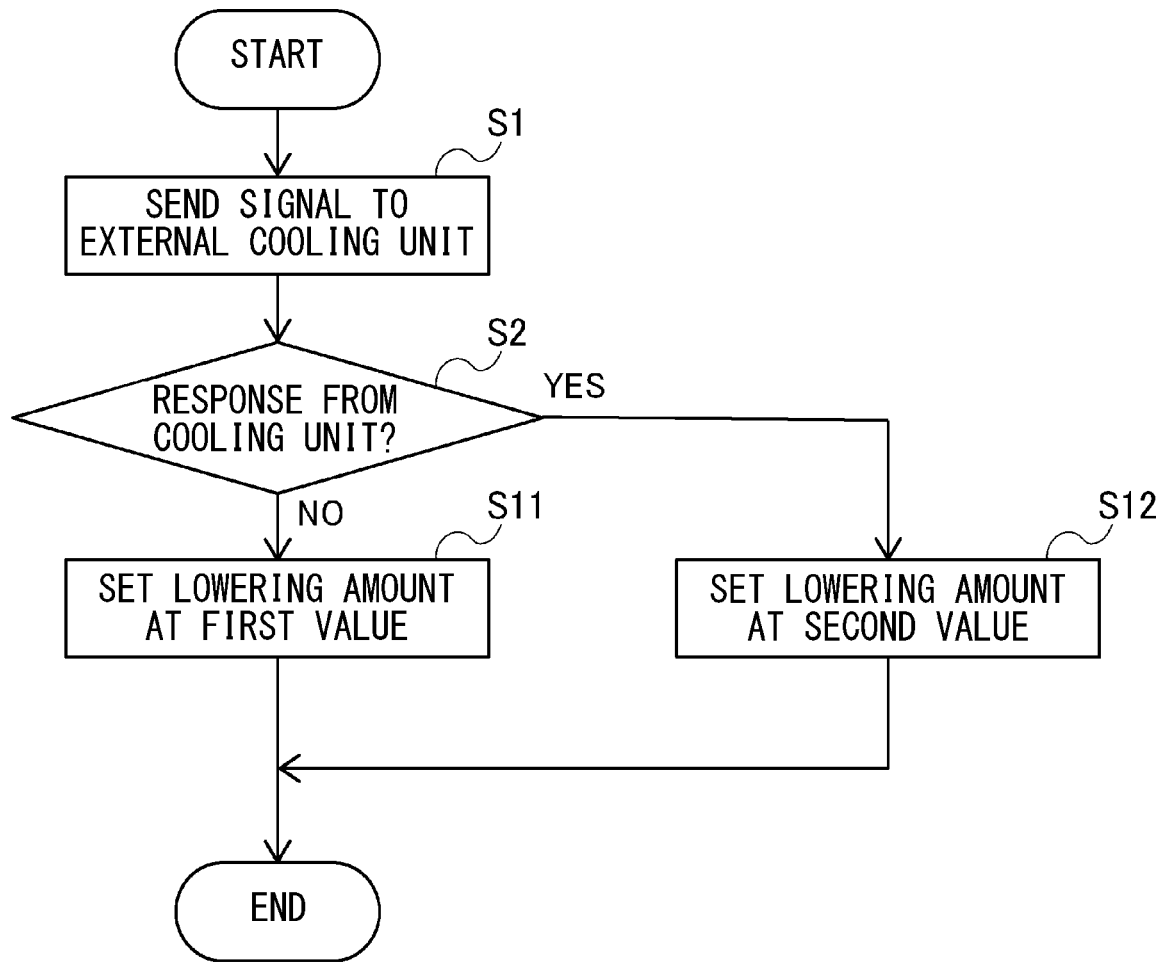
FIG. 9 is a flowchart showing a stacking amount change process.

Next, a changing process of the number of stackable sheets of the recording materials S on the stacking unit 60 will be described using FIG. 9 while making reference to FIG. 1 and FIG. 6. As shown in FIG. 7, the controller 300 sends a predetermined signal to the external cooling device 101 (S1). The controller 300 discriminates whether or not the controller 300 receives a response signal from the external cooling device 101 in response to transmission of the above signal (S2). In the case where the controller 300 did not receives the response signal from the external cooling device 101 (NO of S2), the controller 300 discriminates that the external cooling device 101 is not connected to the image forming apparatus 100, and sets a lowering amount of the stacking unit 60 at a first value (S11). On the other hand, in the case where the controller 300 receives the response signal from the external cooling device 101 (YES of S2), the controller 300 discriminates that the external cooling device 101 is connected to the image forming apparatus 100, and sets the lowering amount of the stacking unit 60 at a second value higher than the first value (S12).

That is, as described above, the stacking unit 60 is provided so as to move in the up-down direction relative to the external cooling device 101, and further, the stacking unit 60 is provided with the stacking detecting portion 61 for detecting that the stacked recording materials S reached a predetermined height. The controller 300 causes the stacking unit 60 to lower in the case where this stacking detecting portion 61 detected that the recording materials S reached the predetermined height, and thus the recording materials S can be made further stackable. The lowering amount of this stacking unit 60 is made larger in the case where the external cooling device 101 is connected to the image forming apparatus 100 than in the case where the external cooling device is not connected to the image forming apparatus 100. By making the lowering amount of the stacking unit 60 large, in the case where the external cooling device 101 is connected to the image forming apparatus 100, when the recording materials S with the same basis weight are stacked, the number of stackable sheets of the recording materials S can be made larger than in the case where the external cooling device 101 is not connected to the image forming apparatus 100.

To the recording materials S stacked at a lower portion of the stacking unit 60, larger pressure is applied as the number of stackable sheets of the recording materials S increases. By the pressure application to the recording materials S, when the toner on the recording material S is in a melted state, sticking can occur between the recording materials S through the toner. For that reason, in the case where the external cooling device 101 is not connected to the image forming apparatus 100, even when the temperature of the recording material S is not lowered to the predetermined temperature or less and the toner is in the melted state, in order to prevent the recording materials S from sticking to each other to the extent possible, there a need to suppress the number of stackable sheets of the recording materials S. On the other hand, in the case where the external cooling device 101 is connected to the image forming apparatus 100, the recording materials S lowered in temperature to the predetermined temperature or less are stacked on the stacking unit 60, so that even when the number of stackable sheets of the recording materials S is made large, the recording materials S cannot cause the sticking. Therefore, in the case where the external cooling device 101 is connected to the image forming apparatus 100, the number of stackable sheets of the recording materials S is made larger than in the case where the external cooling device 101 is not connected to the image forming apparatus 100.

As described above, in this embodiment, the external cooling device 101 was connected to the image forming apparatus 100, so that cooling recording material S cooling power after the toner image fixation was able to be improved. By doing so, even when the heating amount of the fixing device 11 is made large, the temperature of the recording materials S stacked on the stacking unit 60 can be lowered to the predetermined temperature or less at which sticking of the recording materials S does not occur, with the result that the user is capable of adjusting the glossiness without concerning the sticking of the recording materials S on the stacking unit 60. Further, the number of stackable sheets of the recording materials S can be made large, with the result that the user is not required to frequently carry out the recording materials S of the stacking unit 60. Thus, the external cooling device 101 for improving the recording material S cooling power after the toner image fixation is connected to the image forming apparatus 100, so that the image forming system 1X capable of flexibly meeting various kinds of the recording materials S.

Other Embodiments

Incidentally, the changing process of the settable range of the above-described heating amount (see FIG. 7) and of the number of stackable sheets of the recording materials S (see FIG. 9) is made depending on the connection or non-connection of the external cooling device 101 irrespective of the kind of the recording materials S, but the present invention is not limited thereto. For example, even when the external cooling device 101 is not connected to the image forming apparatus 100, depending on the kind of the recording materials S, specifically the above-mentioned case may also be changed to the case where the basis weight is "150-250 g/m$^2$" or more.

Further, in the above-described embodiment, the constitution in which depending on the connection or non-connection of the external cooling device 101 to the image forming apparatus 100, the heating amount settable range (see FIG. 7) or the number of stackable sheets of the recording material S (see FIG. 9) is changed was described as an example, but the following constitution may also be employed. That is, in the case where the external cooling device 101 is connected to the image forming apparatus 100, the number of sheets subjected to image formation per unit time in the case where a plurality of sheets of the recording materials S with a predetermined basis weight or more in basis weight are continuously subjected to image formation is made larger than in the case where the external cooling device 101 is not connected to the image forming apparatus 100. The case where the plurality of sheets of the recording materials S with the predetermined basis weight or more in basis weight are continuously subjected to the image formation is, for example, the case where a job in which 800 sheets of the recording materials S with a first basis weight in a range of "150-250 g/m$^2$" in basis weight are continuously subjected to an image forming process is executed. Further, as a method in which the number of sheets subjected to image formation per unit time, the following method exists. For example, there is a method in which a recording material feeding interval in the case where the external cooling device 101 is connected to the image forming apparatus 100 is made smaller than a recording material feeding interval in the case where the external cooling device 101 is not connected to the image forming apparatus 100. In the case where the external cooling device 101 is not connected to the image forming apparatus 100, by widening the recording material feeding interval, a subsequent recording material S is stacked after the (preceding) recording material S is discharged and then is sufficiently cooled, so that the sticking of the recording materials S during the stacking can be suppressed. In the case where the external cooling device 101 is connected to the image forming apparatus 100, even when a sheet interval is narrowed, the recording material S is sufficiently cooled, so that productivity can be improved. Further, for example, in a method in which a feeding speed in the case where the external cooling device 101 is connected to the image forming apparatus 100 is made faster than a feeding speed in the case where the external cooling device 101 is not connected to the image forming apparatus 100, a similar effect is capable of being achieved.

Figure 10:
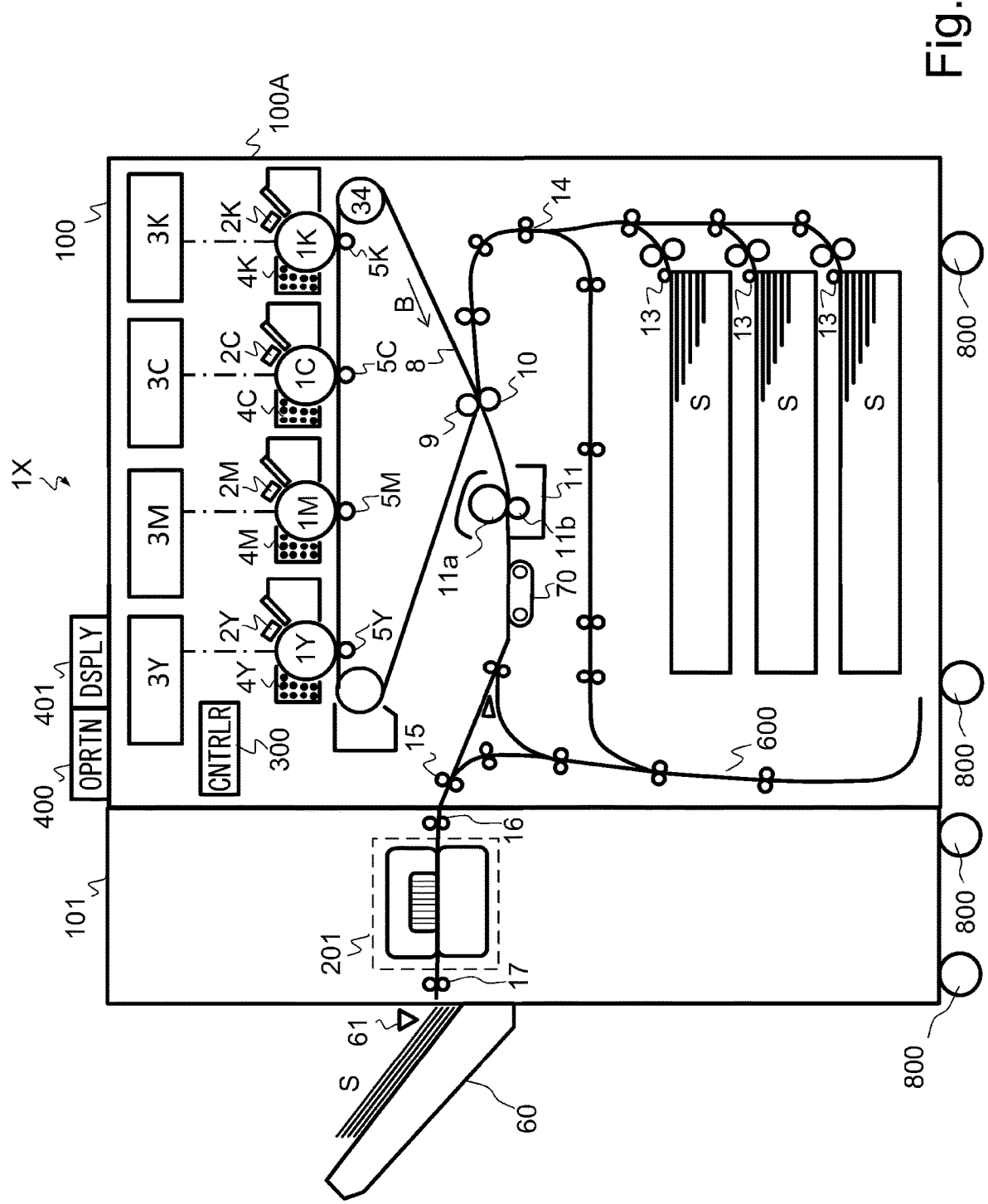
FIG. 10 is a schematic view showing a structure of another image forming system.

Incidentally, in the above-described embodiment, a constitution in which the external cooling device 101 is connected to the image forming apparatus 100 including the recording material cooling device 20 inside thereof was described, but for example, as shown in FIG. 10, a constitution in which the external cooling device 101 is connected to the image forming apparatus 100 in which the recording material cooling device 20 is no provided may also be employed. Thus, the external cooling device 101 can also be connected to the image forming apparatus 100 in which the recording material cooling device 20 is not provided, and therefore cooling performance of the image forming apparatus can be easily improved without buying a new image forming apparatus. Further, even in the case where a recording material, such as thick paper, required to make the fixing temperature high, it is possible to uniformize the glossiness of the toner image and to suppress sticking between the recording materials S stacked on the stacking portion. Thus, it becomes possible to easily meet needs of users requiring improvement in cooling performance of the image forming system 1X.

Figure 11:
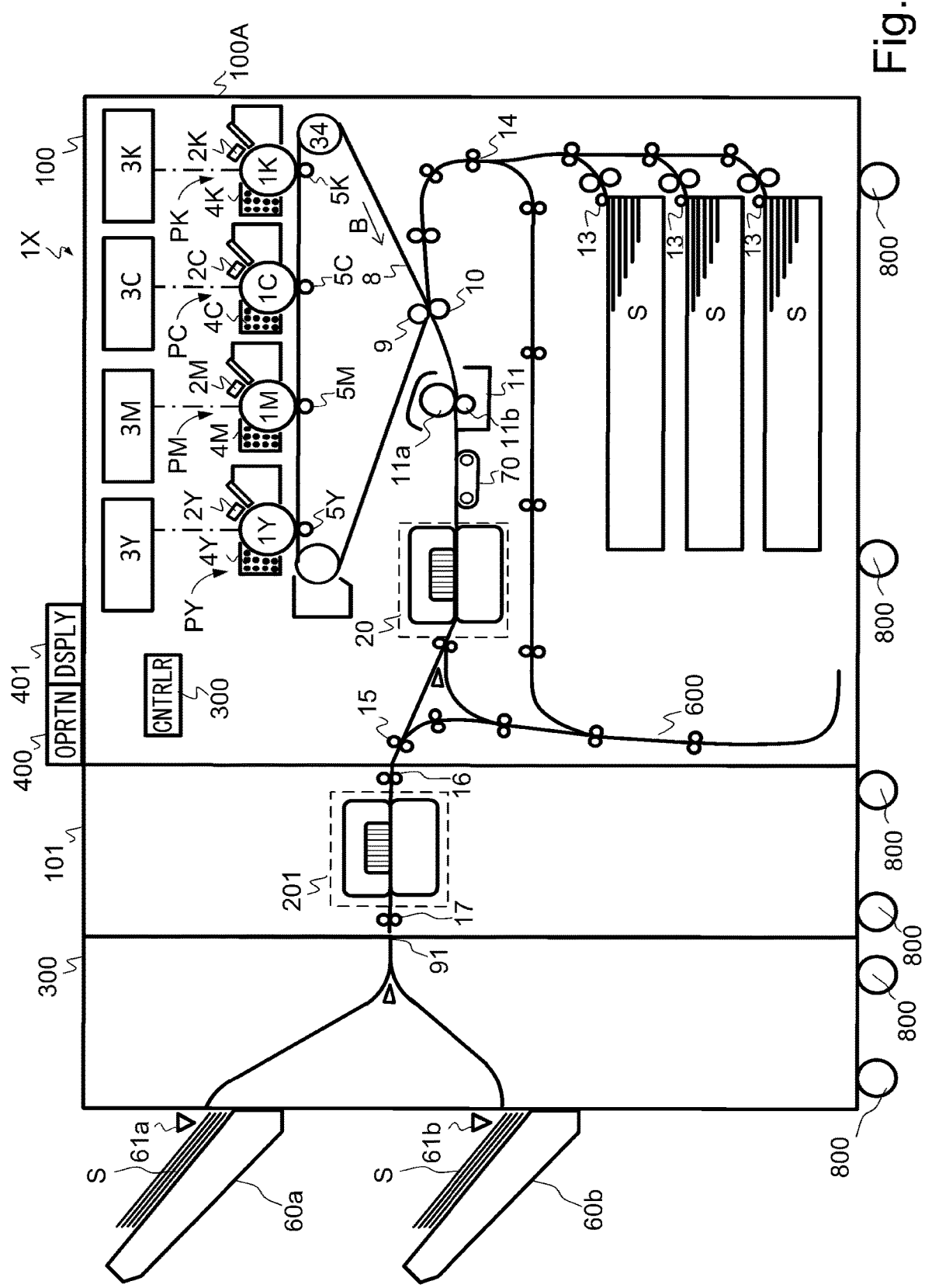
FIG. 11 is a schematic view showing a structure of another image forming system.

Further, as the form of another image forming system 1X, as shown in FIG. 11, a constitution in which a sheet processing device is further connected to the external cooling device 101, on a downstream side with respect to the recording material feeding direction, connected to the image forming apparatus 100 may also be employed. In this case, each of the image forming apparatus 100, the external cooling device 101 and the sheet processing device 300 has a structure in which the apparatus or device is installed on an installation surface such as a floor by a plurality of installation portions 800. In this structure, the sheet processing device 300 is capable of executing a stapling process of the recording materials S by an unshown stapling unit or a boring process of the recording materials S by an unshown punch unit. Further, the sheet processing device 300 includes a plurality of stacking trays 60a and 60b on which the recording materials S are stackable, and by a detecting sensor 61a or 61b, a stacking height or the number of stacked sheets of the recording materials S stacked on the stacking tray 60a or 60b is capable of being detected. Here, the stacking trays 60a and 60b provided to the sheet processing device 300 is larger in the number or weight of the stackable recording materials than the stacking unit 60 provided to the image forming apparatus 100.

Thus, in the case where the sheet processing device 300 is connected to the image forming apparatus 100, images are continuously formed on recording materials S in a large amount (volume) in some instances. In such a case, on the stacking trays 60a and 60b, the recording materials S in the large amount are stacked, and therefore, a possibility that the glossiness of the toner image becomes non-uniform or the recording materials stacked on the stacking portion stick to each other becomes high. Accordingly, the users require improvement in cooling performance of the image forming apparatus in many instances. Even in such a case, according to this embodiment, the external cooling device 101 is capable of being connected between the image forming apparatus 100 and the sheet processing device 300, and therefore, sheets discharged from the image forming apparatus 100 can be cooled by a recording material cooling device 201 before the sheets are stacked on the stacking trays 60a and 60b. By this, it becomes possible to easily meet the needs of the users requiring the improvement in cooling performance of the image forming system 1X.

Figure 12:
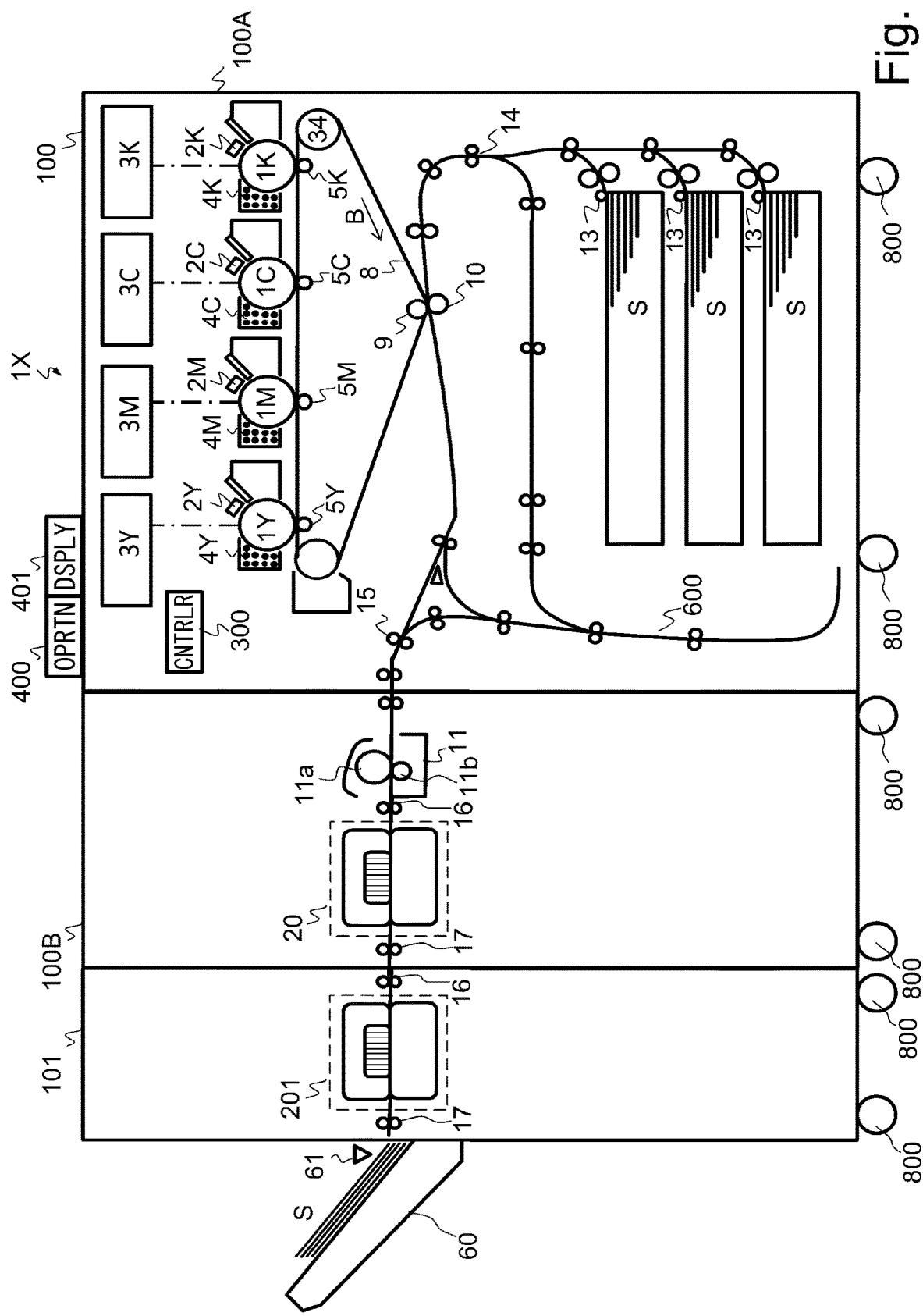
FIG. 12 is a schematic view showing a structure of another image forming system.

Further, as the form of another image forming system, as shown in FIG. 12, a constitution in which a first casing 100A includes a photosensitive drum 1, a charging device 2, an exposure device 3, a developing device 4, an intermediary transfer belt 8 and the like and in which a second casing 100B of the image forming apparatus includes a fixing device 11 and the external cooling device 101 is connected to the image forming apparatus 100 including the recording material cooling device 20 may also be employed. Further, a constitution in which the external cooling device 101 is connected to the image forming apparatus 100 including such first casing 100A and second casing 100B may also be employed.

Figure 13:
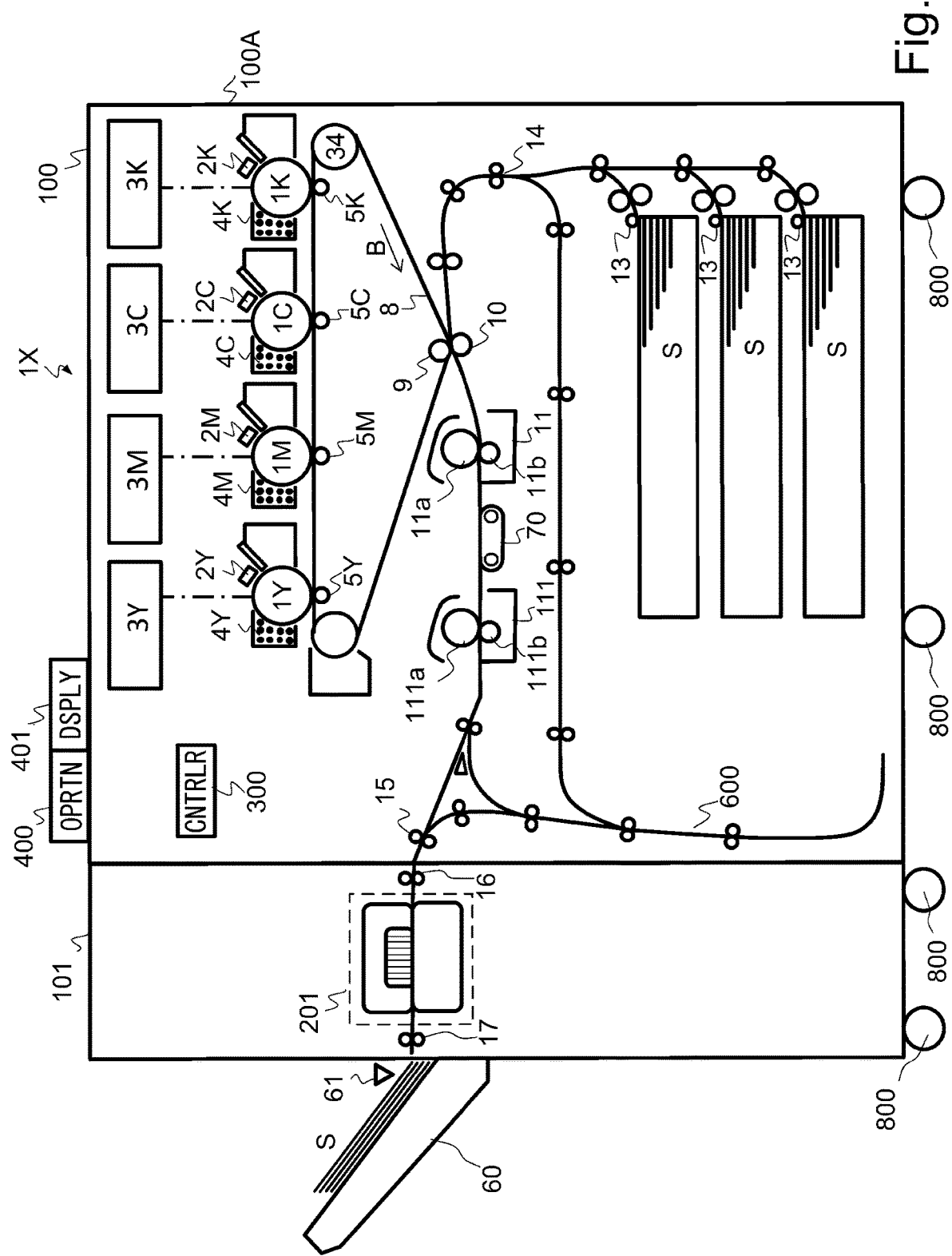
FIG. 13 is a schematic view showing a structure of another image forming system.
Figure 14:
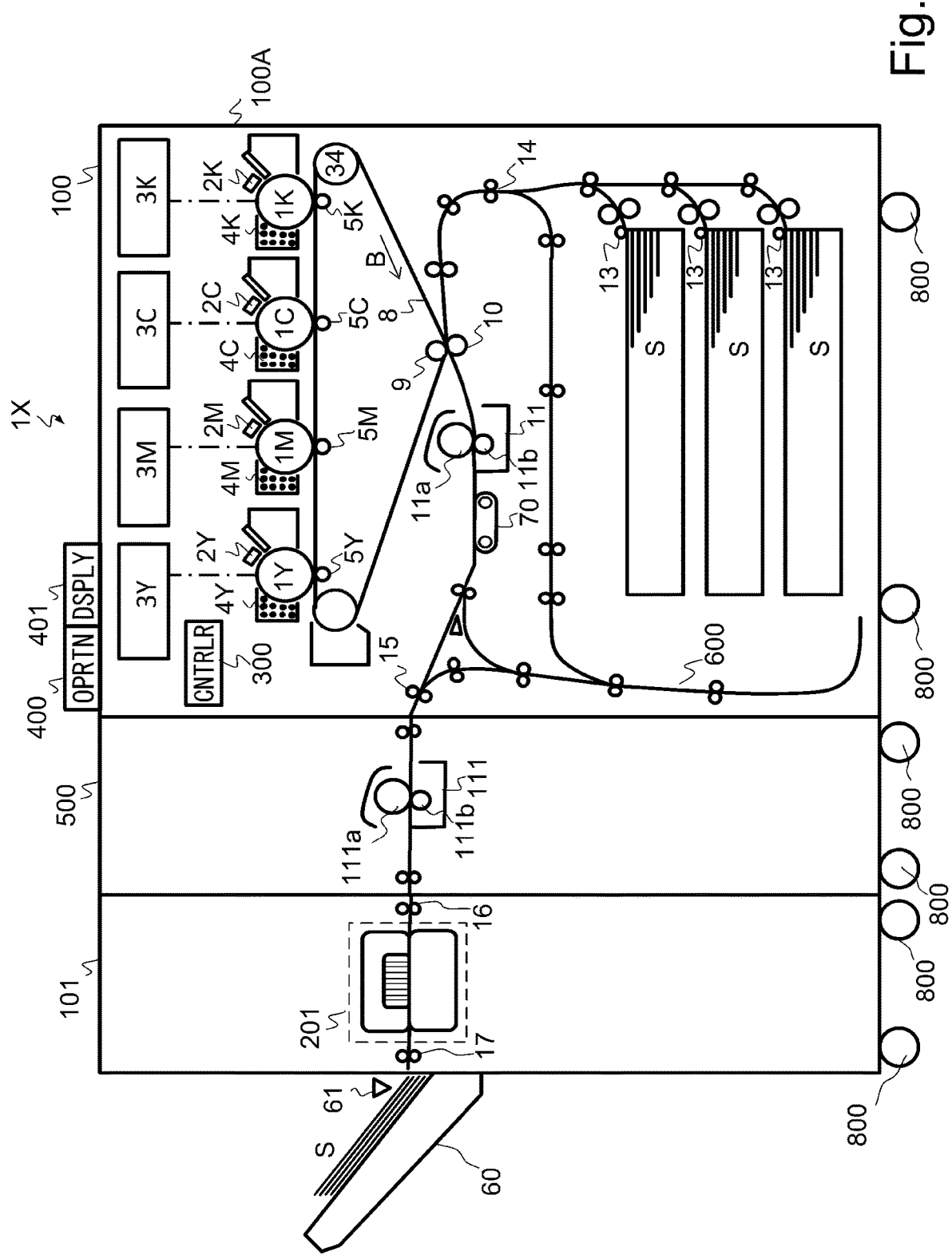
FIG. 14 is a schematic view showing a structure of another image forming system.

Further, as the form of another image forming system, as shown in FIG. 13 and FIG. 14, a constitution in which in an image forming system including a plurality of fixing devices, the external cooling device 101 is connected to the image forming system on a side downstream of the fixing devices may also be employed. For example, FIG. 13 shows a constitution in which the image forming apparatus 100 includes a first fixing device 11 and a second fixing device 111 which are provided in the apparatus main assembly 100A. Thus, by providing the plurality of fixing devices, it becomes possible to enhance the glossiness of the image fixed on the recording material S by the image forming apparatus 100. This is because heat can be added in a large amount to the recording material S on which the toner image is formed and therefore flatness of the toner image fixed on the recording material S is enhanced. Further, by providing the plurality of fixing devices in such a manner, compared with the case where only the fixing device 11 is provided, it becomes possible to fix the toner image on the recording material without lowering the feeding speed when the recording material, such as the thick paper, large in basis weight is fed. This is because in the case where only the fixing device 11 is provided, a constitution in which the feeding speed of the recording material S is lowered for sufficiently heating the toner image when the toner image is fixed on the recording material large in basis weight is employed, whereas heat added to the recording material S can be increased by providing the plurality of fixing devices and thus the recording material S can be sufficiently heated without lowering the feeding speed.

Further, in the case of the image forming apparatus 100 thus including the first fixing device 11 and the second fixing device 111, the recording materials S with a temperature higher in temperature than the recording materials S in the case of the image forming apparatus in which only one fixing device is provided are stacked on the stacking tray 60. By this, a possibility that gloss of the toner image on the recording material S stacked on the stacking tray 60 becomes non-uniform and that the recording materials stacked on the stacking portion stick to each other becomes high. Accordingly, the users require improvement in cooling performance of such an image forming apparatus 100 in many instances. Even in such a case, according to this embodiment, the external cooling device 101 is made connectable to the image forming apparatus 100 including the plurality of fixing devices, and therefore, the sheet discharged from the image forming apparatus 100 can be cooled by the recording material cooling device 201 before the sheet is stacked on the stacking tray 60. By this, it becomes possible to easily meet the needs of the users requiring the improvement in cooling performance of the image forming system 1X.

Incidentally, as a constitution in which the plurality of fixing devices are provided, as shown in FIG. 14, a constitution in which to an outside of the image forming apparatus including the fixing device 11, an external fixing device 300 including the second fixing device 111 is newly connected may also be employed. Here, the external fixing device 300 is a device capable of being selectively connectable, as an option, to the image forming apparatus 100. Such an external fixing device 300 is selectively connected to the image forming apparatus 100 depending on the needs of the users in order to improve the glossiness of the recording material S outputted from the image forming apparatus 100 and a discharging speed (the number of discharged recording materials per unit time) of the paper, large in basis weight, such as the thick paper discharged from the image forming apparatus 100. Thus, even in the case where the external fixing device as the option is connected to the image forming apparatus 100, the plurality of fixing units are provided, and therefore, improvement in cooling performance of the image forming apparatus is required in some instances. Even in such a case, according to this embodiment, the external cooling device 101 can be connected to the external fixing device 300 on a downstream side of the recording material feeding direction, and therefore, it becomes possible to easily meet the needs of the users requiring the improvement in cooling performance of the image forming system 1X.

Incidentally, in explanation of the above-described embodiments, the "connection" between the image forming apparatus 100 and the external cooling device 101 also includes the following constitution in addition to the constitution in which the casing of the external cooling device 101 is connected just behind the frame of the image forming apparatus 100 as shown in FIG. 1. For example, a constitution in which between the image forming apparatus 100 and the external cooling device 101 as shown in FIG. 14, another connecting unit for connecting these image forming apparatus 100 and external cooling device 101 exists is included. The external cooling device 101 may only be required to be a constitution in which the external cooling device 101 is connected to a device (apparatus) including at least the fixing device 11 and in which the external cooling device 11 is mounted on a side downstream of the fixing device 11 with respect to the feeding direction and upstream of the stacking portion on which products are stacked, with respect to the feeding direction.

INDUSTRIAL APPLICABILITY

According to the present invention, it is possible to provide a cooling device and an image forming system which are capable of meeting needs of users requiring further high cooling power.

The present invention is not limited to the above-described embodiments, but can be variously changed and modified without departing from the spirit and the scope of the present invention. Accordingly, the following claims are attached for making the scope of the present invention public.

The present application claims priority on the basis of Japanese Patent Application Nos. 2018-106498 filed on Jun. 1, 2018 and 2019-094460 filed on May 20, 2019, which are hereby incorporated by reference herein in their entirety.

The invention claimed is:

1. An image forming system comprising:
an image forming apparatus including an image forming portion configured to form a toner image on a recording material, and a fixing device configured to fix the toner image formed by said image forming portion on the recording material; and
a cooling apparatus disconnectably connected to said image forming apparatus,
wherein said image forming apparatus further includes:
a first cooling unit provided downstream of said fixing device with respect to a recording material feeding direction and configured to cool the recording material passed through said fixing device, said first cooling unit including a first belt, a first heat sink contacting an inner peripheral surface of said first feeding belt and a first feeding portion for forming a transfer nip in corporation with said first feeding belt and feed the recording material in the transfer nip,
a discharge feeding passage configured to discharge the recording material passed through said first cooling unit to outside of said image forming apparatus via a discharge opening of said image forming apparatus, and
a reverse feeding passage branched from said discharge feeding passage and configured to reverse and feed the recording material passed through said first cooling device toward said image forming portion; and
wherein said disconnectably connected cooling apparatus further includes:
an inlet feeding unit configured to receive and feed the recording material discharged from said discharge opening of said image forming apparatus, and
a second cooling unit provided downstream of said inlet feeding unit with respect to the recording material feeding direction and configured to cool the recording material, said second cooling unit including a second belt, a second heat sink contacting an inner peripheral surface of said second feeding belt and a second feeding portion for forming a transfer nip in corporation with said second feeding belt and feed the recording material in the transfer nip.

2. The image forming system according to claim 1, wherein said image forming apparatus is capable of fixing the toner image on the recording material at a temperature higher in a case that said cooling device is connected thereto than in a case that said cooling device is not connected thereto.

3. The image forming system according to claim 1, wherein said image forming apparatus includes an operating portion capable of receiving setting of a user relating to glossiness of the toner image formed on the recording material, and
wherein said image forming apparatus changes a settable range relating to glossiness in said operating portion so that a setting for making the glossiness of the toner image by said operating portion is higher in a case that said cooling device is connected thereto than in a case that said cooling device is not connected thereto.

4. The image forming system according to claim 1, further comprising a stacking portion capable of stacking the recording material on which the toner image is fixed, and
wherein said image forming apparatus stacks the recording material on said stacking portion in a case that said cooling device is connected thereto in an amount greater than in a case that said cooling device is not connected thereto, the recording material having the same basis weight in each case.

5. The image forming system according to claim 1, wherein said fixing device includes a heating portion including a heating source and a pressing portion that is capable of nipping and feeding the recording material in cooperation with said heating portion and that presses the recording material against said heating portion,
wherein said first feeding portion includes a third feeding belt for forming a nip in cooperation with said first feeding belt and for feeding a recording medium in cooperation with said first feeding belt, and the first heat sink contacting an inner peripheral surface of said first feeding belt in the nip,
wherein said first feeding belt is provided on a side where said heating portion is provided, relative to a feeding passage, along which the recording material, on which the toner image is fixed, is fed by said fixing device, and
wherein said third feeding belt is provided on a side where said pressing portion is provided relative to said feeding passage, and nips and feeds the recording material, on which the toner image is fixed, by said fixing device, in cooperation with said first feeding belt.

6. The image forming system according to claim 5, wherein said second feeding portion includes fourth feeding belt for forming a nip in cooperation with said second feeding belt and for feeding a recording medium in cooperation with said second feeding belt, and the second heat sink contacting an inner peripheral surface of said second feeding belt in the nip,
wherein said second feeding belt is provided on a side where said heating portion is provided, relative to a feeding passage, along which the recording material, on which the toner image is fixed, is fed by said fixing device, and
wherein said fourth feeding belt is provided on a side where said pressing portion is provided relative to said feeding passage, and nips and feeds the recording material, on which the toner image is fixed, by said fixing device, in cooperation with said second feeding belt.

7. The image forming system according to claim 1, further comprising a stacking portion, dismountably provided on said cooling apparatus, configured to stack the recording material discharged from a discharge opening of said cooling apparatus.

8. The image forming system according to claim 1, wherein said stacking portion is mountable on said image forming apparatus to stack the recording material discharged from a discharge opening of said image forming apparatus in a case in which said cooling apparatus is not connected to said image forming apparatus.

* * * * *